United States Patent [19]

Vicik

[11] Patent Number: 5,382,470
[45] Date of Patent: Jan. 17, 1995

[54] EVOH OXYGEN BARRIER STRETCHED MULTILAYER FILM

[75] Inventor: Stephen J. Vicik, Darien, Ill.

[73] Assignee: Viskase Corporation, Chicago, Ill.

[21] Appl. No.: 44,669

[22] Filed: Apr. 9, 1993

[51] Int. Cl.6 .................................................. B32B 7/12
[52] U.S. Cl. .................................... 428/334; 428/349;
428/516; 428/518; 428/475.8
[58] Field of Search ............... 428/516, 349, 518, 334, 428/475.8

[56] References Cited

U.S. PATENT DOCUMENTS

| | | | |
|---|---|---|---|
| 4,407,897 | 10/1983 | Farrell et al. | 428/516 |
| 4,495,249 | 1/1985 | Ohya et al. | 428/516 |
| 4,557,780 | 12/1985 | Newsome et al. | 156/244.11 |
| 4,615,926 | 10/1986 | Hsu et al. | |
| 4,724,185 | 2/1988 | Shah . | |
| 4,734,327 | 3/1988 | Vicik | 428/332 |
| 4,758,463 | 7/1988 | Vicik et al. | 428/216 |
| 4,851,290 | 7/1989 | Vicik | 428/334 |
| 4,857,399 | 8/1989 | Vicik . | |
| 4,857,408 | 8/1989 | Vicik . | |
| 5,004,647 | 4/1991 | Shah . | |
| 5,075,143 | 12/1991 | Bekele | 428/349 |

Primary Examiner—Edith Buffalow
Attorney, Agent, or Firm—Roger Aceto

[57] ABSTRACT

A biaxially stretched oriented heat shrinkable film for food packaging comprising an EVOH-nylon 6,66 core layer, second and third intermediate adhesive layers, a self heat sealable fourth outer layer and an abuse-resistant fifth outer layer.

20 Claims, 2 Drawing Sheets

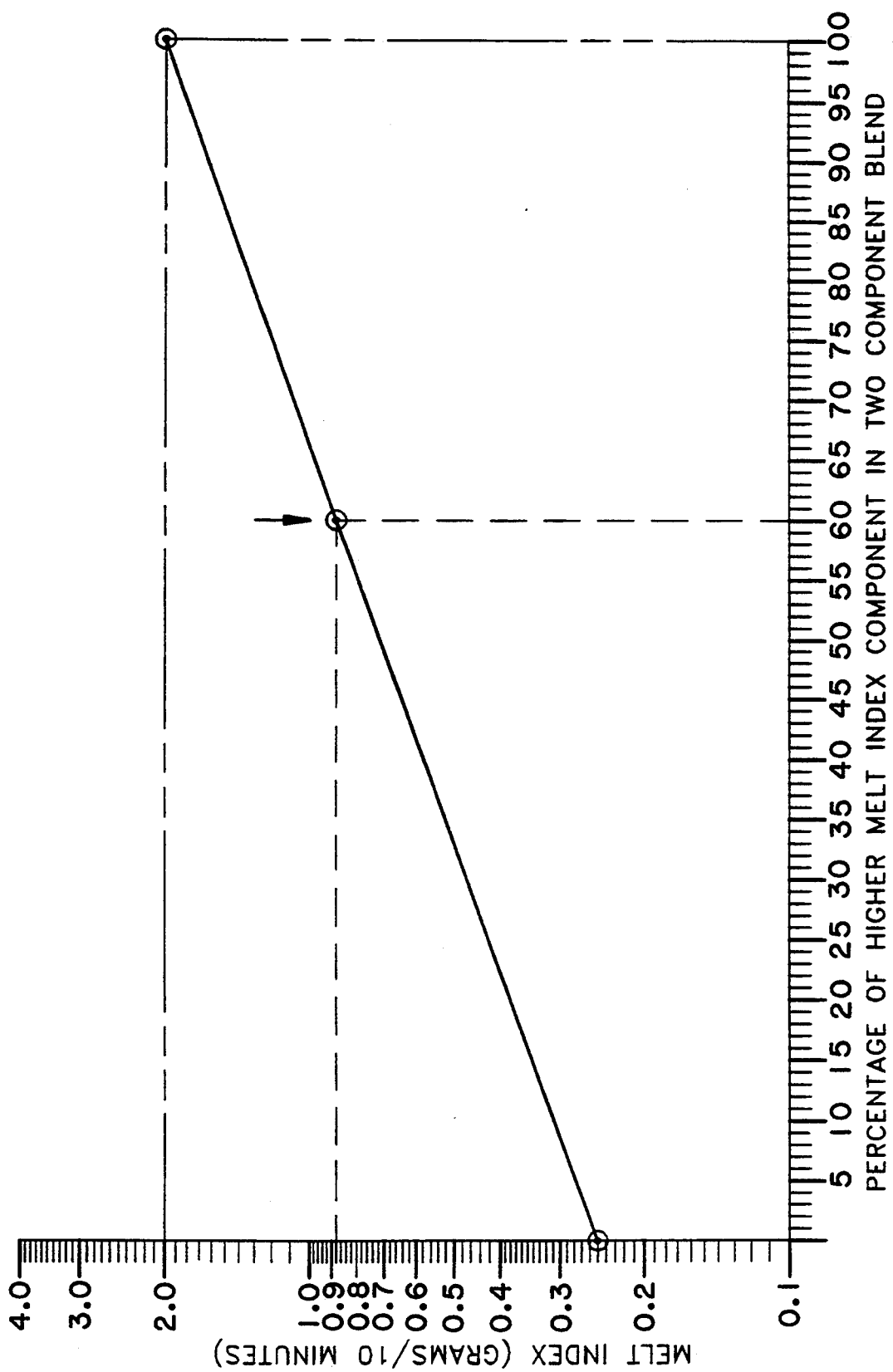

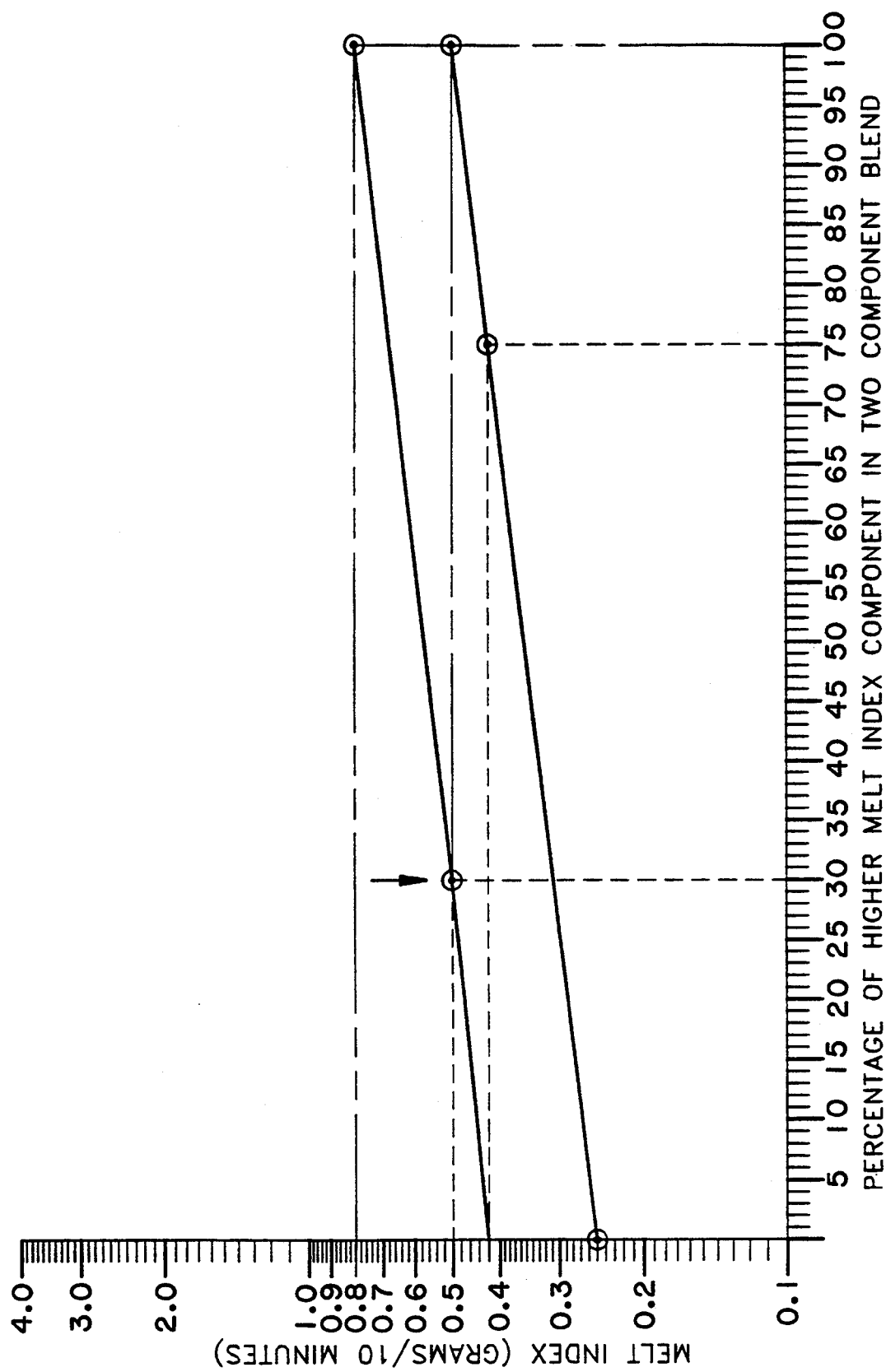

EVOH OXYGEN BARRIER STRETCHED MULTILAYER FILM

This invention relates to biaxially stretched heat shrinkable multilayer films with an EVOH-based oxygen barrier core layer, as for example used in food packaging.

BACKGROUND OF THE INVENTION

Thermoplastic films have been used for many years in connection with packaging of various articles including food products such as fresh red meat. The latter is often in the form of large pieces (primal cuts) which are placed in bags formed of thermoplastic films which are evacuated and sealed as for example by heating the opposite surfaces of the bag at the open mouth end and pressing the inner surfaces together to form a heat seal.

The resulting food-containing packages are often shipped from the packing house to supermarkets or retail butchers where the packages are opened and the primal cuts divided into smaller pieces for retail packaging. These food-containing packages must provide an oxygen-free environment for substantial periods such as 4–8 weeks, so the film packaging art has provided multilayer films with a core layer which is an oxygen barrier material. The most commonly used oxygen barrier materials are vinylidene chloride copolymers with various comonomers such as vinyl chloride (VD-VDC copolymer) or methyl acrylate (MA-VDC copolymer). Other known oxygen barrier materials include polyamides and ethylene vinyl alcohol copolymer (EVOH).

In addition to the oxygen barrier function, the thermoplastic film has several other requirements as for example resistance to abuse and stress during packaging and handling, an attractive uniform appearance with no streaks, and good optical properties so that the valuable food product such as a fresh red meat primal cut may be periodically visually inspected to insure that the package integrity has not been lost. Accordingly, good optical properties include low haze and high gloss.

From a functional standpoint, the thermoplastic film must provide high abuse resistance because the food-containing packages are often moved several times in the shipping-distribution chain and subjected to external abuse and impact. Also, the inside surface usually must be heat sealable to itself, and since different heat sealing apparatus often operate at different temperatures, the inside surface must be heat sealable over a wide temperature range.

Another physical requirement of suitable thermoplastic films for packaging oxygen sensitive products such as fresh red meat, is that the film must be heat shrinkable in both the machine direction (MD) and the transverse direction (TD). This is necessary so that the food-containing film package may be evacuated with the film inner wall collapsing against the food product outer surface, and thereafter heated as for example by hot water spray in a tunnel to heat shrink the collapsed film and provide a tight package.

Because of these numerous requirements, thermoplastic films commonly have at least three layers; the aforementioned core-barrier layer, an abuse resistant layer on one side of the core layer and a heat sealing layer on the other side of the core layer.

Heretofore, a commonly used multilayer film for packaging fresh red meat has been a three layer type comprising a vinylidene chloride copolymer barrier layer and polyolefin layers on opposite sides, most commonly polyethylene-ethylene vinyl acetate (EVA) blend abuse and heat sealing layers. The preferred polyethylenes are very low density polyethylene (VLDPE) which is also called ultra low density polyethylene (ULDPE), and linear low density polyethylene (LLDPE).

In part because of increasing emphasis by governmental authorities on incineration disposal of waste materials without generation of chlorine-containing gases, there is a need to identify a nonchloride type oxygen barrier film.

Another reason why there is a need to replace vinylidene chloride copolymer type oxygen barrier layers is their well known tendency to partially degrade and discolor when exposed to substantial doses of irradiation. Irradiative crosslinking is commonly said to improve the puncture resistance of the polyethylene in the inner and outer layers, or improve the tensile strength of the EVA in the inner layer to permit biaxial orientation by forming a stable bubble of the primary tube, or to widen the heat sealing range of the inner layer, or a combination of the above. When VC-VDC copolymer is irradiated at doses in the order of 5 MR, the material partially degrades and develops a yellowish tint which is aesthetically unpleasing.

EVOH has been known for many years as a suitable oxygen barrier material, and in fact is commercially used in certain food packaging applications as for example, cook-in systems wherein the fresh food body is placed in a bag which is evacuated and sealed. The package is then placed in a hot water bath and the food body cooked insitu. After cooking the package is cooled and stored at low temperature until ready for use. In general, these cook-in packages need not be heat shrinkable to the extent required in the fresh red meat market, and are not subjected to the physical abuse experienced by fresh red meat packages.

To the best of our knowledge, EVOH-based oxygen barrier layer films have not been widely used in commerce for the packaging, sorting and shipping of fresh red meat. One reason is that EVOH is far more sensitive to moisture contact than vinylidene chloride copolymers. That is, the oxygen barrier quality of EVOH rapidly and irreversibly declines when exposed to significant quantities of water. This means that the EVOH layer must be extremely well protected against moisture intrusion from the stored product through the inner layer(s) and also from the atmosphere through the outer layer(s).

Another reason why EVOH has not been widely used as an oxygen barrier layer in thermoplastic bags for packaging fresh red meat is that its adhesion properties to polyethylene-EVA blends are substantially inferior to vinylidene chloride copolymers. Whereas the latter may be adhered directly to polyethylene-EVA blends with sufficient strength to withstand delamination forces during heat shrink, this has not been possible with EVOH-based oxygen barrier layers. Instead, it has been necessary to add additional layers between the barrier layer and the abuse or heat sealing layers. These extra layers are known as adhesive to tie layers and perform a function of interlayer adhesion between the EVOH layer and the (outer) abuse resistant layer or the (inner) heat sealing layer in the bag formed from the multilayer thermoplastic film. The materials forming these adhesive layers are chemically complex, as for example polyethylene-based modified maleic anhydride types, hence expensive. Moreover they add to the complexity and expense of the manufacturing process.

A further reason why EVOH multilayer films have not replaced vinylidene chloride copolymer films is that the former are far more sensitive to biaxial orientation conditions, and the range of satisfactory processing conditions is much narrower.

Still another reason why EVOH-based oxygen barrier layers have not replaced vinylidene chloride copolymer types is that EVOH resin cost is much higher. Typically the EVOH-based layer in presently known multilayer films comprises between about 8 and 20% of the total film thickness, and is the most expensive material in the film.

An object of this invention is to provide a biaxially stretched heat shrinkable multilayer film with an EVOH-based oxygen barrier layer, and having physical properties at least equivalent to vinylidene chloride copolymer barrier layer films currently used to package fresh red meat.

Another object is to provide such an EVOH-based barrier layer type film with a barrier layer substantially thinner than known EVOH type multilayer films proposed for fresh red meat packaging.

A further object is to provide such an EVOH-based barrier layer type film having fewer than six layers.

A still further object is to provide such an EVOH-based barrier layer type film with at least equivalent optical properties to vinylidene chloride copolymer barrier type multilayer films currently used for fresh red meat packaging.

Other objects and advantages of the inventive film will be apparent from the ensuing disclosure and appended claims.

U.S. Pat. No. 4,407,897 to Farrell et al describes a multilayer film comprising an EVOH core layer, intermediate modified polyolefin adhesive layers, and polyolefin outer layers.

U.S. Pat. No. 4,495,249 to Ohya et al describes a biaxially stretched heat shrinkable multilayer film comprising an EVOH core layer, intermediate adhesive layers formed of carboxylic acid modified polyethylene, and EVA-LLDPE blend outer layers.

U.S. Pat. No. 4,557,780 to Newsome et al describes a biaxially stretched heat shrinkable multilayer film comprising a 0–50% polyamide e.g. nylon 6,66 and 50–100% EVOH core layer, intermediate adhesive layers formed of olefinic polymers having carboxyl modifications, and outer layers comprising 40–100% EVA and 0–60% LLDPE.

U.S. Pat. No. 4,615,926 to Hsu et al describes a multilayer film comprising an EVOH-polyamide core layer, olefin based adhesive intermediate layers, an ionomer inner layer and a polyethylene outer layer.

U.S. Pat. No. 4,758,463 to Vicik describes a three layer biaxially stretched heat shrinkable film suitable for meat cook-in applications, having an EVOH-polyamide core layer and outer layers comprising a blend of EVA and an EVA anhydride functionally adhesive compound. This type film is not suitable for use in fresh red meat packaging because of its relatively low puncture resistance and relatively high cost EVOH core layer.

U.S. Pat. No. 4,851,290 to Vicik discloses a three layer irradiated film for holding hot-filled foods during the succeeding cold water tumble-chilling and further refrigerating steps, comprising a nylon 6,12 or nylon 6,66 core layer, and outer layers comprising a blend of 50–75% polyethylene or EVA and 25–50% polyethylene-modified adhesive or EVA modified adhesive.

U.S. Pat. No. 4,857,399 to Vicik describes a four layer biaxially stretched heat shrinkable film suitable for nonadhering meat cook-in applications, having an EVOH-polyamide core barrier layer, a blend of EVA and anhydride-modified ethylene copolymer adhesive as an outer abuse layer on one side of the barrier layer, an EVA-anhydride-modified ethylene copolymer blend as a layer on the other side of the barrier core layer, and an inner or meat contacting layer comprising an ethylene-propylene random copolymer. This type film is not suitable for use in fresh red meat packaging because of its relatively poor optical properties and relatively low shrink.

U.S. Pat. No. 5,004,647 to Shah describes a biaxially stretched heat shrinkable film having an 80–99% EVOH and 1–20% polyamide blend core layer, intermediate adhesive layers for example formed of anhydride-modified polyethylene, and three component blend outer layers of LLDPE, linear medium density polyethylene (LMDPE) and EVA.

U.S. Pat. No. 5,075,143 to Bekele describes a nine layer film having an EVOH core layer, intermediate EVA layers, adhesive layers formed of chemically modified polyolefin, and moisture resistant layers formed of ionomer or VLDPE. The outer layers are a VLDPE sealant layer on the inside, and a heat resistant HDPE layer on the outside.

SUMMARY OF THE INVENTION

This invention is a biaxially oriented heat shrinkable multilayer film prepared by the double bubble process and having at least five layers: an oxygen barrier core layer, second and third intermediate adhesive layers directly adhered to opposite sides of the core layer, a self heat sealable fourth outer layer directly adhered to the side of the second intermediate adhesive layer opposite the core layer, and an abuse-resistant fifth outer layer directly adhered to the side of the third intermediate adhesive layer opposite the core layer. When this film is converted to a bag, the fourth outer layer is on the inside and when there are only five layers it is in direct contact with the stored product, and the fifth outer layer is on the outside in direct contact with the surrounding environment when there are only five layers.

The oxygen barrier core layer comprises a polymer blend having a relatively high weighted average melting point. The blend comprises between about 70 and about 85 wt. % ethylene vinyl alcohol (EVOH) and between about 15 and about 30 wt. % nylon 6,66 copolymer. The EVOH has a melting point of about 162° C. to about 178° C. The nylon 6,66 copolymer has a melting point within about 35° C. of the EVOH melting point. The polymer blend has a relatively high average melting point. The core layer has a thickness of between about 0.05 and about 0.1 mil and provides an oxygen barrier such that the oxygen permeability through the film is below about 35 cc/m$^2$/24 hours (2.26 cc/100 in$^2$/24 hours). This permeability is measured at 1 atm. and 23° C. for the thickness of film tested.

The second and third intermediate adhesive layers each comprise a blend of between about 35 and about 80 wt. % very low density polyethylene and between about 20 and about 40 wt. % of either polyethylene-based modified anhydride adhesive having a melt index below about 1.7 or EVA-based modified anhydride adhesive having a melt index below about 0.5. These layers may also contain between 0 and about 40 wt. % ethylene vinyl acetate having fractional melt index and between about 7 and about 15 wt. % vinyl acetate content. The two or three component blend(s) have fractional average melt indexes, and also relatively low average melting points below the average melting point of said polymer blend of the core layer. The second and third intermediate adhesive layers each comprise between about 2.5 and about 5% of the film thickness.

The self heat sealable fourth layer (which becomes the inner layer of a bag formed from the film) comprises one or more thermoplastic polymers with the EVA content of the layer between 0 and about 45 wt. %. This layer has a fractional melt index and a relatively low melting point below the average melting point of the core layer polymer blend. This fourth outer layer comprises between about 40% and about 70% of the film thickness.

The abuse-resistant fifth outer layer (which becomes the outer layer of a bag formed from the film) comprises one or more thermoplastic polymers with the EVA content of the layer between 0 and about 45 wt. %. This layer has a fractional melt index, and also a relatively low melting point below the average melting point of the core layer polymer blend. The fifth outer layer comprises between about 20% and about 35% of the film thickness.

At least one of the fourth and fifth outer layers has a melting point of at least about 105° C.

If either or both fourth and the fifth outer layer comprises a blend of polyolefins, the above-described relationships are based on the average melt index of the blend. Similarly, the above-described relationships are based on the average melting point of the blend.

The film of this invention also has at least 30% free shrink at 90° C. in the transverse direction, and a total thickness of between about 1.5 and 3.5 mils.

As will be apparent from the ensuing discussion, the instant film accomplishes all of the aforedescribed objects. For example, its physical properties are at least equivalent to vinylidene chloride copolymer barrier layer films currently used to package fresh red meat. Also, the inventive film has an EVOH-based barrier layer which is substantially thinner than known EVOH type multilayer films proposed for fresh red meat packaging. This film requires no more than five layers, and has at least equivalent optical properties to PVDC barrier type multilayer films currently used for fresh red meat packages. Also this film has the relatively high heat shrink and puncture resistance required for fresh red meat packaging.

Other advantages of the inventive film will be apparent from the ensuing disclosure.

DESCRIPTION OF THE DRAWINGS

FIGS. 1 and 2 are logarithmic graphs of melt index versus percent of the higher melt index polymer in blends.

DETAILED DESCRIPTION OF THE INVENTION

As previously explained, the multilayer film of this invention is "biaxially stretched heat shrinkable". As used herein this means that the film has an unrestrained shrinkage of at least thirty (30) percent in the transverse direction measured at 90° C. (194° F.), and preferably and at least twenty (20) percent unrestrained shrinkage in the machine direction. Most preferably, the film has an unrestrained shrinkage of at least thirty (30) percent in both directions.

For purposes of measuring the shrink value of a thermoplastic film and comparing it with these definitions, the unrestrained shrink of the film is measured by a procedure derived from ASTM D2732 after immersion in a water bath at 90° C. for five seconds. Four test specimens are cut from a given sample of the film to be tested. The specimens are cut to 10 cm. in the machine direction by 10 cm. in the transverse direction. Each specimen is completely immersed for 5 seconds in a 90° C. water bath. After removal from the water bath the distance between the ends of the specimen is measured. The difference in the measured distance for the shrunken specimen and the original 10 cm. is multiplied by ten to obtain the percent of shrinkage for the specimen. The shrinkage for the four specimens is averaged for the MD shrinkage values of the given film sample, and the shrinkage for the four specimens is averaged for the TD shrinkage value.

Where polymer blends are used in any of the enumerated five layers of the film and melt index is an important physical characteristic of the layer, it is defined in terms of "average melt index". For a given polymer blend this average is determined from FIGS. 1 and 2 which are logarithmic graphs of melt index on one axis (e.g. the ordinate) and percent of the higher melt index polymer in the blend, on the other axis (e.g. the abscissa). The melt index of the constituent polymers are measured according to the procedure outlined in ASTM D 1238 at 190° C. unless specified otherwise and in grams per 10 minutes. The steps in this procedure for determination of average melt index of a two component blend are as follows:

1. Plot the melt index of the lower melt index component to correspond to 0% on the percent of higher melt index component in the blend axis (as a point).
2. Plot the melt index of the higher melt index of the higher melt index component to correspond to 100% on the percent of higher melt index component in the blend axis (as a point).
3. Connect the two points with a straight line.
4. The average melt index of the blend is determined by locating the point on the straight line which corresponds to the percent of higher melt index component in the blend.

If the blend contains three components, the average melt index of a blend of two of the components is determined as described above. The average melt index of these two components is then plotted on the graph versus the third component as described in steps 1 and 2 above. From the straight line connecting the two points, the average melt index of the three component blend can be determined from the point on the line which corresponds to the percent of the highest index component(s) in the blend. If the average melt index of the two component blend is higher than that of the third component, the two component average melt index is employed as the percent of the highest melting component in the blend and plotted accordingly.

Determination of average melt index for a two component blend using FIG. 1 is illustrated as follows: The blend comprises 40 wt. % EVA having a melt index of 0.25 and 60% LLDPE-based anhydride modified adhesive having a melt index of 2.0. The EVE melt index is located as a point on the left side ordinate scale corresponding to 0% adhesive. The adhesive melt index is located as a point on the right side ordinate scale corresponding to 100% adhesive. The two points are connected as a straight line. The average melt index of the blend is determined by locating a point on this line which corresponds to 60 wt. % adhesive on the abscissa, i.e. about 0.88 gms/10 min.

Determination of the average melt index for a three component blend using FIG. 2 is illustrated as follows: The blend comprises 52.5% VLDPE having a melt index of 0.5, 17.5 wt. % EVA having a melt index of 0.25, and 30% LLDPE-based anhydride modified adhesive having a melt index of 0.8. The EVA melt index is located as a point on the left side ordinate scale corresponding to 0% adhesive. The VLDPE melt index is located as a point on the right side ordinate scale corresponding to 100% VLDPE. The two points are connected as a straight line. The average melt index for the EVA-LLDPE blend is determined by locating a point on this line which corresponds to 75% VLDPE on the abscissa, i.e. about 0.42 gms/10 min. This value is located as a point on the left side ordinate scale corresponding to 0% adhesive. The adhesive melt index is located as a point on the right side ordinate scale corresponding to 100% adhesive (0.8). The two points are connected as a straight line. The average melt index of the three component blend is determined by locating a point on this line which corresponds to 30% adhesive on the abscissa, i.e. 0.50 gms/10 min.

Where polymer blends are used in any of the enumerated five layers of the film and melting point is an important physical characteristic of the layer, it is defined in terms of "average melting point". For a given polymer blend this is calculated by adding the product of the individual polymer's melting point and its blend fraction, i.e. polymer 1 melting point times its blend fraction plus polymer 2 melting point times its blend fraction plus the corresponding factor for any other components in the blend.

The expression "fractional" means that the melt index of a single polymer or the average melt index of a polymer blend does not exceed about 1.

The terms "barrier" or "barrier layer" as used herein mean a layer of a multilayer film which acts as a physical barrier to gaseous oxygen molecules. Physically, a barrier layer material will reduce the oxygen permeability of a film (used to form the bag) to less than 70 cc per square meter in 24 hours at one atmosphere, 73° F. (23° C.) and 0% relative humidity. These values should be measured in accordance with ASTM standard D-1434.

The expression "ethylene vinyl acetate copolymer" (EVA) as used herein refers to a copolymer formed from ethylene and vinyl acetate monomers wherein the ethylene derived units (monomer units) in the copolymer are present in major amounts (by weight) and the vinyl acetate derived units (monomer units) in the copolymer are present in minor, by weight, amounts.

The expression very low density polyethylene ("VLDPE") sometimes called ultra low density polyethylene ("ULDPE"), refers to linear and non-plastomeric polyethylenes having densities below about 0.914 g/cm$^3$ and according to at least one manufacturer, possibly as low as 0.86 g/cm$^3$. This expression does not include ethylene alpha olefin copolymers of densities below about 0.90 g/cm$^3$ with elastomeric properties and referred to by at least one manufacturer as "ethylene alpha olefin plastomers". However, as hereinafter explained, ethylene alpha olefin plastomers may be advantageously used in the practice of this invention as a minor constituent in certain layers of this multilayer film. VLDPE does not include linear low density polyethylenes (LLDPE) which have densities in the range of about 0.915–0.930 gm/cm$^3$.

VLDPE comprises copolymers (including terpolymers) of ethylene with alpha-olefins, usually 1-butene, 1-hexene or 1-octene, and in some instances terpolymers, as for example of ethylene, 1-butene and 1-hexene. A process for making VLDPEs is described in European Patent Document publication number 120,503 whose text and drawing are hereby incorporated by reference into the present document.

As for example described in Ferguson et al. U.S. Pat. No. 4,640,856 and Lustig et al. U.S. Pat. No. 4,863,769, VLDPEs are capable of use in biaxially oriented films which have superior properties to comparable films with LLDPEs. These superior properties include higher shrink, higher tensile strength and greater puncture resistance.

Suitable VLDPEs include those manufactured by Dow Chemical Company, Exxon Chemical Company and Union Carbide Corporation, and having the following physical properties in the resin form according to the manufacturers, as summarized in Table A.

TABLE A

| VLDPE Physical Properties | | | | |
|---|---|---|---|---|
| Type | Manufacturer | Property/ ASTM No. | Units | Value |
| Attane XU61520. 01 and 4001 | Dow (ethylene-octene copolymer) | Melt Index (D-1238) | g/10 min. | 1.0 |
| Attane XU61509. 32 | Dow (ethylene-octene copolymer) | | | |
| Properties are similar to type 4001 except that melt index is 0.5 | | Density (D-792) | g/cc | 0.912 |
| | | Melting Point (by DSC) | °C. | 123 |
| Attane 4003 | Dow (ethylene-octene copolymer | Melt Index (D-1238) | g/10 min | 0.8 |
| | | Density (D-792) | g/cc | 0.905 |
| | | Melting Point | °C. | 123 |
| DFDA 1137 | Union Carbide (ethylene-butene copolymer) | Melt Index (D-1238) | g/10 min | 1.0 |
| | | Density (D-792) | g/cc | 0.905 |
| | | Melting Point (by DSC) | °C. | 120 |
| DEFD 1192 | Union Carbide (ethylene-butene-hexene terpolymer) | Melt Index (D-1238) | g/10 min | 0.19 |
| | | Density (D-792) | g/cc | 0.912 |
| | | Melting Point (by DSC) | °C. | 122 |

EVOH is prepared by the hydrolysis (or saponification) of an ethylene-vinyl acetate copolymer, and it is well known that to be an effective oxygen barrier, the hydrolysis-saponification must be nearly complete, i.e. to the extent of at least 97%. EVOH is commercially available in resin form with various percentages of ethylene and there is a direct relationship between ethylene content and melting point.

In the practice of this invention, the EVOH component of the oxygen barrier core layer has a melting point between about 162° C. and about 178° C. This is characteristic of EVOH materials having ethylene content of between about 38 mol % and about 44 mol %. It has been discovered that when used in the core layer polymer blend, EVOH materials with melting points below this range result in core layers which do not have sufficient oxygen barrier properties to produce a satisfactory heat shrinkable product with a thin core layer. For this reason, EVOH materials with about 48 mol % and higher ethylene content (resulting in melting points below about 162° F.) are unsuitable for practicing this invention, as will be demonstrated in Example 1 (sample 1).

On the other hand, it has been discovered that EVOH materials with melting points above the aforedescribed range are too stiff and difficult to stretch during biorientation of the multilayer film of this invention. Accordingly, EVOH with about 32 mol % and lower ethylene content are not suitable for practicing this invention. For these reasons a 38 mol % ethylene-type EVOH is preferred.

EVOH materials also differ in melt index, even with the same ethylene content. For example, 38 mol % ethylene type EVOH is commercially available with melt indexes of 3 to 8 g/10 min (measured at 190° C. per ASTM D 1238). Although melt index is not a limitation in selecting suitable EVOH materials, the higher melt indexes are preferred because the resulting film softens and stretches more easily during biaxial orientation. For these reasons, an 8.4 melt index 38 mol % ethylene-type EVOH is preferred for use in the polymer blend of the multilayer film core layer.

Representative EVOH materials for use in this invention are listed in Table B.

TABLE B

| Type & Manufacturer | EVOH Physical Properties Property | Units | Value |
|---|---|---|---|
| EVAL H 101 (EVALCA) | Ethylene Content | mol % | 38 |
| | Melt Index (D1238 at 210° C.) | g/10 min | 3.8 |
| | Melting Point (by DSC) | °C. (°F.) | 175 (347) |
| EVAL H 103 (EVALCA) | Ethylene Content | mol % | 38 |
| | Melt Tndex (D1238 at 210° C.) | g/10 min | 8.4 |
| | Melting Point (by DSC) | °C. (°F.) | 175 (347) |
| EVAL H 151 (EVALCA) | Ethylene Content | mol % | 38 |
| | Melt Index (D1238 at 210° C.) | g/10 min | 3.8 |
| | Melting Point (by DSC) | °C. (°F.) | 175 (347) |
| EVAL K 102 (EVALCA) | Ethylene Content | mol % | 38 |
| | Melt Index (D1238 at 210° C.) | g/10 min | 6.0 |
| | Melting Point (by DSC) | °C. (°F.) | 175 (347) |
| EVAL E 105 (EVALCA) | Ethylene Content | mol % | 44 |
| | Melt Index (D1238 at 210° C.) | g/10 min | 13.0 |
| | Melting Point (by DSC) | °C. (°F.) | 165 (329) |
| EVAL G 156 (EVALCA) | Ethylene Content | mol % | 48 |
| | Melt Index (D1238 at 190° C.) | g/10 min | 6.4 |
| | Melting Point (by DSC) | °C. (°F.) | 158 (320) |
| EVAL E 151 (EVALCA) | Ethylene Content | mol % | 44 |
| | Melt Index (D1238 at 210° C.) | g/10 min | 3.5 |
| | Melting Point (by DSC) | °C. (°F.) | 165 (329) |
| SOARNOL 3803 (Nippon Synthetic Chemical Industry Co. hereinafter "Nippon") | Ethylene Content | mol % | 38 |
| | Melt Index (D1238 at 210° C.) | g/10 min | 3.2 |
| | Melting Point (by DSC) | °C. (°F.) | 173 (343) |
| SOARNOL 3808 (Nippon) | Ethylene Content | mol % | 38 |
| | Melt Index (D1238 at 210° C.) | g/10 min | 8 |
| | Melting Point (by DSC) | °C. (°F.) | 173 (343) |
| SOARNOL 4403 (Nippon) | Ethylene Content | mol % | 44 |
| | Melt Index (D1238 at 210° C.) | g/10 min | 3.5 |
| | Melting Point (by DSC) | °C. (°F.) | 164 (327) |

It has been discovered that the inventive film can only employ nylon 6,66 as the polyamide in the polymer blend of the oxygen barrier layer. Nylon 6,66 is a copolymer of nylon 6 and nylon 66. Nylon 6 is polyepsilon caprolactam. Nylon 66 is the polymer derived from adipic acid and hexamethylene diamine. Nylon 6,66 is manufactured by different companies, in some instances with different percentages of the two monomers, possibly by different methods and presumably with different operating parameters. Accordingly, the properties of various nylon 6,66 copolymers may differ significantly. For example, the melting temperature decreases as the nylon 66 content is increased from 5% to 20 mol %.

As will be illustrated in Example 2, when other nylons such as type 6,12 are used as the polyamide in the polymer blend of the oxygen barrier layer, gels develop in the core layer of the five layer film and in some instances cracks develop. The gels may be due to EVOH-nylon 6,12 incompatibility or chemical reaction between the two polymers. The cracks probably develop because the polymer blend is not stretching uniformly during the orientation. The physical properties of representative nylons are summarized in Table C.

TABLE C

| Type & Manufacturer | Nylon Physical Properties Property | Units | Value |
|---|---|---|---|
| Nylon 1539 (type 6,66) Allied Chemical Co | Copolymer 6 content | mol % | 85 |
| | Copolymer 66 content | | 15 |
| | Melting Point (by DSC) | °C. (°F.) | 195 (383) |
| Nylon 5033 (type 6,66) Ube Ind. Ltd. | Copolymer 6 content | mol % | 85 |
| | Copolymer 66 content | | 15 |
| | Melting Point (by DSC) | °C. (°F.) | 196 (385) |
| Nylon 6041 (type 6,66) Toray Industries | Copolymer 6 content | mol % | 85 |
| | Copolymer 66 content | | 15 |
| | Melting Point (by DSC) | °C. (°F.) | 196 (385) |
| Nylon CR9 (type 6,12 Emser Chemical Co. | Melting Point (by DCS) | °C. (°F.) | 196 (385) |
| Nylon 6041 (type 6,66) Toray Industries | Copolymer 6 content | mol % | 85 |
| | Copolymer 66 content | | 15 |
| | Melting Point (by DSC) | °C. (°F.) | 196 (385) |
| Nylon CF62BSE (type 6,12) Emser Chemical Co. | Melting Point (by DSC) | °C. (°F.) | 134 (273) |
| Nylon C35Q2 (type 6,66: nucleated) BASF | Melting Point (by DSC) | °C. (°F.) | 196 (385) |
| Nylon Selar 3426 (type amorphous 6I/6T) DuPont | Melting Point (by DSC) | °C. (°F.) | amorphous |

It will be recalled that in the inventive film the oxygen barrier core layer comprises a polymer blend of between about 70 and about 85 wt. % EVOH, and between about 15 and about 30 wt. % nylon 6,66. If less than about 15 wt. % nylon 6,66 is used, the core layer tends to crack (sometimes referred to as "line-drawing") rather than stretch uniformly during biaxial orientation. This is in part because EVOH is relatively brittle. Also EVOH can only be stretched over a relatively narrow temperature range. More than about 30 wt. % nylon should not be used in the core layer polymer blend, because the oxygen barrier quality of the blend declines to an unacceptable level. A polymer blend between about 78 and 82% EVOH and about 18 and 22% nylon 6,66 is preferred.

A variety of ethylene vinyl acetates having fractional melt indexes may be used in at least the second and third intermediate adhesive layers, and having vinyl acetate contents between about 7 and about 15% of the copolymer total weight. Lower VA contents than this range are too stiff and inelastic. Higher VA contents tend to be excessively soft. Vinyl acetate contents in the range of 8-12 wt. % are preferred from the standpoint of processability and strength. Suitable EVAs include those listed in Table D. Since the at least five layer film of this invention requires that at least one of the fourth and fifth outer layers has a melting point of at least 105° C., it will be apparent from Table D (and demonstrated in Example 2, Table G) that both of these layers cannot comprise 100% of these EVAs (discussed hereinafter).

TABLE D

EVA Physical Properties

| Type | Manufacturer | Property/ ASTM No. | Units | Value |
|---|---|---|---|---|
| XV67.06 | Exxon | Vinyl acetate content | wt. % | 10 |
| | | Melt index (D-1238) | g/10 min. | 0.25 |
| | | Melting Point (by DSC) | °C. | 99 |
| DQDA 6833 | Union Carbide | Vinyl acetate content | wt. % | 10 |
| | | Melt Index (D-1238) | g/10 min. | 0.25 |
| | | Melting Point by (DSC) | °C. | 98 |
| Elvax 3135 | DuPont | Vinyl acetate content | wt. % | 12 |
| | | Melt Index (D-1238) | g/10 min. | 0.25 |
| | | Melting Point (by DSC) | °C. | 95 |

As previously indicated, the second and third intermediate adhesive layers are bonded to opposite sides of the oxygen barrier core layer, and each comprise a blend of two essential components: 35-80 wt. fractional melt index VLDPE, and 20-40% of either: (a) polyethylene-based modified anhydride adhesive with melt index less than about 1.7, or (b) EVA-based modified anhydride adhesive with melt index less than about 0.5. A third optional component is 0 to about 40 wt. % fractional melt index EVA having between about 7 and about 15 wt. % vinyl acetate content. The two or three component blend(s) comprising the second and third intermediate adhesive layers have a fractional average melt index and also a average melting point below that of the core layer polymer blend.

Table E is a partial list of anhydride modified ethylene copolymer-based adhesives used in the ensuing examples.

TABLE E

Anhydride Modified Ethylene Copolymer Adhesives

| Type & Manufacture | Base | Melt Index[3] (g/10 min) | Melting[2] Point °C. (°F.) |
|---|---|---|---|
| Plexar 106 (Quantum Company) | EVA (9% vinyl acetate) | 1.2 | 98 (208) |
| Plexar PPX 5075[1] (Quantum Company) | EVA (10% vinyl acetate) | 0.25 | 98 (208) |
| Plexar 169 (Quantum Company) | LDPE (0.92 density) | 2.5 | 105 (221) |
| Plexar 3779 (Quantum Company) | LLDPE (hexene) | 0.8 | 120 (248) |
| Plexar 3741 (Quantum Company) | LLDPE (butene) | 1.5 | 120 (248) |
| Admer 500 (Mitsui Petro. Ltd.) | LLDPE | 2.0 | 120 (248) |
| Bynel CXA 3048 (DuPont Chemical Company) | EVA terpolymer | 0.9 | 98 (208) |
| Orevac 18302 (Atochem Company) | EVA terpolymer | 0.8 | — |

[1]Prepared from DQDA 6833 type EVA
[2]By DSC
[3]According to D-1238 and measured at 190° C.

The five layer film of this invention may be manufactured by extrusion of all layers simultaneously i.e. coextruded as for example described in Schirmer U.S. Pat. No. 4,448,792 or in steps i.e. by the coating lamination procedure described in Brax et al U.S. Pat. No. 3,741,253 to form a relatively thick primary film either as a flat sheet or as a tube, most commonly the latter. This primary and relatively thick film is biaxially oriented by the well-known trapped bubble or double bubble technique as for example described in Pahlke U.S. Pat. No. 3,456,044. In this technique an extruded primary tube leaving the tubular extrusion die is cooled, collapsed and then preferably oriented by reheating and reinflating to form a secondary bubble. The film is preferably biaxially oriented wherein transverse (TD) orientation is accomplished by inflation to radially expand the heated film. Machine direction (MD) orientation is preferably accomplished with the use of nip rolls rotating at different speeds to pull or draw the film tube in the machine direction.

The stretch ratio in the biaxial orientation to form the bag material is sufficient to provide a film with total thickness of between about 1.5 and 3.5 mils. The MD stretch ratio is typically 3-5 and the TD stretch ratio is also typically 3-5. An overall stretch ratio (MD stretch multiplied by TD stretch) of about 9x-25x is suitable.

The preferred method for forming the multilayer film is coextrusion of the primary tube which is then biaxially oriented in the manner broadly described in the aforementioned Pahlke Patent. In the following examples all five layers were coextruded and the primary tube was cooled. It was then partially reheated with radiant heaters and further heated to the draw temperature for biaxial orientation by an air cushion which had itself been heated by transverse flow through a heated porous tube concentrically positioned around the moving primary tube.

It has been determined that during biaxial orientation relatively low blow ratios provide higher shrink values than relatively high blow ratios when preparing the five layer film of this invention. For example, using a primary tube flat width of 3⅜ inches in each instance, a blow ratio of 4.6 produced a film with 21% MD/32% TD shrink. With a blow ratio of 3.3, the same film had 31% MD/39% TD shrink at 90° C.

Although not essential, it is preferred to cross link the entire film to broaden the heat sealing range of the inner and outer layers. This is preferably done by irradiation with an electron beam at dosage levels of at least about 1 megarad (MR) and preferably in the range of 3–5 MR, although higher dosages may be employed. Irradiation may be done on the primary tube or after biaxial orientation. The latter, called post-irradiation, is preferred and described in Lustig et al U.S. Pat. No. 4,737,391. An advantage of post-irradiation is that a relatively thin film is treated instead of the relatively thick primary tube, thereby reducing the power requirement for a given treatment level. A possible advantage of preorientation irradiation is that if the practitioner is using a barrier layer material which tends to discolor on irradiation as for example vinylidene chloride-vinyl chloride copolymer, this problem may be avoided by irradiating only a substrate layer as described in the aforementioned Brax et al patent.

Alternatively, cross linking may be achieved by addition of a cross linking enhancer to one or more of the layers, as for example described in Evert et al U.S. Pat. No. 4,055,328. The most commonly used cross linking enhancers are organic peroxides such as trimethylpropane and trimethylacrylate.

It will be seen from the following description that the five layer film of this invention has a very thin EVOH-nylon 6,66 blend core layer thickness of between about 0.05 and about 0.1 mil yet provides an oxygen permeability of less than about 35 cm/m²/24 hours. The latter is the performance level required for shrink packaging fresh red meat. This has been accomplished with a substantially thinner barrier layer containing the relatively expensive EVOH than heretofore proposed films of this type. Yet the total thickness of the film is between about 1.5 and about 3.5 mils, the same as the conventional multilayer oxygen-moisture barrier films currently used in fresh red meat packaging.

The second and third adhesive layers of this film are the next most expensive components, and they each comprise only between about 2.5 and 5% of the film thickness.

The fourth outer layer of the film becomes the inner layer of a bag formed from the film, and is in direct contact with the packaged meat product. This layer comprises between about 40% and about 70% of the film thickness and as the thickest layer provides the bulk for the necessary shrink properties. The inner surface of this fourth layer is also self heat sealable, i.e. the inner surfaces are sealed together after evacuation of the meat-containing bag. The thickness of this bag inner layer must comprise at least about 40% of the total thickness of the film to prevent burn through during heat sealing. On the other hand, the fourth layer should not comprise more than about 70% of the film thickness because the fifth layer (which becomes the outer layer of the bag) must have sufficient bulk for abuse and puncture resistance from outside contact. As such, the fifth layer comprises between about 20% and about 35% of the film thickness. Conversely, if the fifth layer thickness exceeds about 35% of the total film, the fourth layer is too thin to perform the above-described functions of the bag inner layer.

The EVOH-nylon 66 blend barrier core layer of this film has a relatively high average melting point. In this context "relatively high" refers to the relatively low average melting point(s) of the blend(s) comprising the second and third intermediate adhesive layers as well as the relatively low melting points of the fourth and fifth outer layers. These relatively low melting points must be sufficiently low for the film to shrink at least 30% at 90° C. in the transverse direction and preferably at least 20% in the machine direction. This is a requirement for shrinking the meat-containing evacuated and sealed bag against the meat outer surface by movement through the conventional hot water-heated shrink tunnel.

EXAMPLE 1

This series of tests demonstrates the importance of using EVOH having a melting point between about 162° C. and about 178° C. and ethylene content of between about 36 and about 44 mol % in the core layer polymer blend of a five layer film. Six different core layer blends were used (each comprising 80% EVOH and 20% of the same Allied type 1539 nylon 6,66). For samples 2–6 the same formulations were used with identical second and third intermediate layers, and identical fourth and fifth outer layers. The thicknesses in mils (and percentage of the total film thicknesses) for the first to fifth layers were as follows: 0.08(3)/0.08 (32)/0.08 (3)/1.72 (65)/0.69 (26). Sample 1 had somewhat different intermediate and outer layers from samples 2–6. For sample 1 the second and third intermediate layers were 53% DEFD 1192 type VLDPE, 30% Plexar 3741 adhesive and 17% DQDA 6833 type EVA, and the weighted average melting point was 116° C. The fourth outer layer was 100% DQDA 6833 type EVA and the fifth outer layer was 76.5% DQDA 6833 type EVA, 19.1% DFFD 1192 type VLDPE and 4.4% processing aid. For samples 2–6, the second and third intermediate layers were 52.5% Attane XU 61509.32 type VLDPE, 30% Plexar 3779 adhesive and 17.5% DQDA 6833 type EVA and their average melting point was 116° C. The fourth and fifth outer layers were 70.6% DEFD 1192 type VLDPE, 25% DQDA 6833 type EVA and 4.4% processing aid. Their average melt index was 0.25 g/10 min, and their weighted average melting point was 115° C.

The optical properties were observed and in certain instances the gloss was measured. Certain physical properties were also measured i.e. % shrink and dynamic puncture resistance. The results of these tests are summarized in Table F.

Sample 2 with 80% of the 38% ethylene type EVOH and 20% nylon 6,66 as the core layer, had fair appearance. Sample 3 with the same nylon as sample 2 but with a substantially higher melt index type EVOH from the same manufacturer (8.4 vs. 3.8), provided better appearance and slightly higher shrink. This illustrates a preference for 38% ethylene type EVOH-8 melt index material in the multilayer film core layer. Samples 4 and 5 included 38% ethylene type EVOH from a different manufacturer and provided good properties. The melting point of these copolymers was 173° C. This data supports the about 178° C. melting point upper limit for the EVOH in the multilayer film oxygen barrier core layer of this invention. When the EVOH melting point exceeds about 178° C. and its ethylene content is below about 36 wt. %, the material is not easily stretched at orientation temperatures suitable for the much lower melting temperature second-fifth layers. The result is that the film's heat shrink is unacceptably low for packaging fresh meat.

Sample 6 included 44% ethylene type EVOH, a relatively low melting point EVOH embodiment of the invention, i.e. 164° C.

EVOH is relatively inflexible at the substantially lower biorientation temperature suitable for the lower melting adhesive and outer layers, nylon is blended with the

TABLE F

| Sample No. | EVOH Types[8] | | | | | |
|---|---|---|---|---|---|---|
| | 1 | 2 | 3 | 4 | 5 | 6 |
| Core Layer Composition | 80% G156[2]/ 20% nylon 1539[3] | 80% H101[1]/ 20% nylon 1530[3] | 80% H103[4]/ 20% nylon 1539[3] | 80% 3803[5]/ 20% nylon 1539[3] | 80% 3808[6]/ 20% nylon 1539[3] | 80% 4403[7]/ 20% nylon 1539[3] |
| EVOH M.P. °C. (% Eth) | 158 (48) | 175 (38) | 175 (38) | 173 (38) | 173 (38) | 164 (44) |
| Core Layer Ave. M.P. °C.(°F.) | 166 (331) | 179 (340) | 179 (340) | 179 (340) | 179 (340) | 171 (340) |
| Ox. Permeability[9] | 93/2.35 | 13.6/2.80 | 9.8/2.60 | 11.9/2.30 | 8.4/2.80 | 28.1/2.70 |
| Haze, % | 4.6 | | 8.5 | 6.2 | 6.3 | 6.3 |
| Appearance[10] | good | fair | good | good | good | good |
| Gloss, H.U. | 79.8 | | 64.6 | 67.0 | 70.8 | 70.9 |
| % Shrink MD/TD | | | | | | |
| at 90° C. | 40/49 | 20/34 | 22/38 | 13/33 | 27/38 | 20/37 |
| at 80° C. | 25/38 | 12/23 | 14/25 | 8/23 | 17/26 | 11/36 |
| Dynamic Puncture (cmkg/mil) | 2.40 | 1.91 | 1.71 | 1.52 | 2.04 | 1.57 |
| Tensile Strength (psi) MD/TD | 8373/7767 | 8030/8803 | 8602/7939 | 7299/7809 | 10058/8864 | 10058/8864 |

[1]EVAL H101 is 38% ethylene EVOH
[2]EVAL G156 is 48% ethylene EVOH
[3]Nylon 1539 is a type 6,66 copolymer
[4]EVAL H103 is 38% ethylene EVOH
[5]Soarnol 3803 is 38% ethylene EVOH
[6]Soarnol 3808 is 38% ethylene EVOH
[7]Soarnol 4403 is 44% ethylene EVOH
[8]Samples 2-6 had identical intermediate (two) and identical outer (two) layers
[9]The first number is the actual measurement in cc/m²/24 hrs. The second number is the film thickness in mils at the point of measurement.
[10]Appearance refers to gel streaks and cracks Sample 1 with 48% ethylene type EVOH and a 158° C. melting point provided satisfactory optical, shrink and strength properties but the oxygen transmission rate was substantially higher than the lower ethylene content —higher melting point EVOH samples, and unacceptable high for commercial use. The differences between the sample 1 and sample 2-6 second through fifth layers do not affect the relative oxygen transmission rates of these samples. This data supports the about 44% ethylene upper limit and 162° C. melting point lower limit for the EVOH in the multilayer film oxygen barrier core layer of this invention.

Summarizing, samples 2-6 are invention embodiments wherein the average melting points of the core layer are higher than the other layers, and fourth and fifth outer layers have about the same melting points as the second and third intermediate adhesive layers. These values are as follows: 179° C. (core layer), 116° C. (adhesive layers) and 115° C. (outer layers). The adhesive and outer layers have fractional melt indexes.

The EVOH melting point range of 162°–178° C. is substantially above that of PVDC, the most commonly used oxygen barrier in multilayer films for fresh red meat packaging; the vinylidene chloride copolymers melt at about 148°–150° C. Since the higher melting EVOH to increase flexibility of the core layer and in general improve processing characteristics. In the film of this invention the barrier layer is a blend of between about 70 and about 85 wt. % EVOH and between about 15 and about 30 wt. % nylon 6, 66. Higher EVOH content does not provide sufficient flexibility and higher nylon 6, 66 content reduces the barrier properties to an unacceptable level for the intended use. A preferred balance of these considerations is a core blend of between about 78 and about 82 wt. % EVOH and between about 12 and about 18 wt. % nylon 6, 66.

EXAMPLE 2

This series of tests with five layer films illustrates the importance of using nylon 6,66 as the polyamide component of the EVOH-based oxygen barrier core layer. In general, it has been discovered that when gels appear in this type film they occur in the core layer. For this reason, the presence or absence of gels is a direct indication of the compatibility of a particular construction of EVOH and nylon in the core layer. Eight different samples are included with various polymer combinations in the core layer which comprised 80% EVOH and 20% nylon. The results are summarized in Table G.

TABLE G

| Sample No | Nylon Type | EVOH Type (% Ethylene) | Nylon Types in Core Layer Core Layer Average Melting Point (°C.) | Outer Layers Average Melting Point (°C.) | Optical Appearance |
|---|---|---|---|---|---|
| 7 | 6,12[1] | 38[6] | 180 | 75% VLDPE, 2 25% EVA (115) | severe gels |
| 8 | 6,12[1] | 44[8] | 162 | 75% VLDPE, 25% EVA (115) | severe gels |
| 9 | 6,66[2] | 38[6] | 167 | EVA (98) | severe gels |
| 10 | 95% 6,12 & 5% amorph. nylon[3] | 38[6] | — | EVA in one layer (98), 75% VLDPE, 25% EVA in other layer (115) | severe gels |
| 2 | 6,66[4] | 38[6] | 180 | 75% VLDPE, 25% EVA (115) | fair; few gels |
| 3 | 6,66[4] | 38[7] | 180 | 75% VLDPE, 25% EVA (115) | good; no gels |
| 6 | 6,66[4] | 44[9] | 171 | 75% VLDPE, 25% EVA (115) | good; no gels |
| 11 | 6,66[5] | 38[6] | 178 | EVA (98) | poor; many gels |

[1] nylon CR 9
[2] nylon CF62BSE
[3] nylon CR 9 and Selar 3426
[4] nylon 1539
[5] nylon 5033
[6] H 101 EVOH
[7] H 103 EVOH
[8] E 105 EVOH
[9] 4403 EVOH Table G shows that none of the nylon 6,12 containing core layer films had satisfactory optical properties (samples 7, 8 and 10). This was possibly due to a partial reaction between the nylon and EVOH, or a mixing or incompatibility phenomena, resulting in severe gels.

In contrast, samples 3 and 6 with nylon 6,66 were optically superior with no gels, notwithstanding the use of different types of EVOH in the core layer (38 and 44 mol % ethylene respectively). Samples 2 and 3 each included the same type nylon 6,66 but the former was only fair from an optical standpoint because it had a few gels. In contrast sample 3 had no gels and was optically superior, probably because of the 8.4 melt index of its EVOH compared to the sample 2 value of 3.8 melt index EVOH. The thicknesses in mils (and percentages of the total film thickness) for the first to fifth layers of invention embodiment samples 2, 3 and 6 were as follows:

| Sample | |
|---|---|
| 2 | 0.079 (3), 0.079 (3), 0.079 (3), 1.716 (65), 0.686 (26) |
| 3 | 0.086 (3), 0.086 (3), 0.086 (3), 1.866 (65), 0.746 (26) |
| 6 | 0.086 (3), 0.086 (3), 0.086 (3), 1.372 (65), 0.749 (26) |

The second and third intermediate adhesive layers of Table G samples were 30% Plexar 169 adhesive and 70% DQDA 6833 type EVA (samples 7-9), 60% Admer 500 adhesive and 40% DQDA 6833 type EVA (sample 10), 52.5% Attane 61509.32, 17.5% DQDA 6833 type EVA and 30% Plexar 3779 adhesive (samples 2 and 3) or 30% Plexar 3741 (sample 6), and 30% Plexar 169 adhesive and 70% DQDA 6833 type EVA (sample 11). Their average melt indexes (g/10 min) were: 0.51 (samples 7-9), 0.86 (sample 10), 0.46 (samples 2, 3), 0.54 (sample 6) and 0.51 (sample 11). Their average melting points (in °C.) were: 100° (samples 7-9), 111° (sample 10), 116° (samples 2, 3 and 6), and 101° (sample 11). Table G illustrates that the nylon in the oxygen barrier core layer of the inventive five layer film must be nylon 6,66.

It will be noted that the optical properties of five layer films of this invention with oxygen barrier core layers having the same percent ethylene-type EVOH and nylon 6,66 are not necessarily the same. For example, samples 2, 9 and 11 have the same type EVOH comprising 80% of the core layer, and 20% nylon 6,66, but samples 9 and 11 have 100% EVA with no VLDPE in their outer layers. In contrast the sample 2 outer layers comprise 75% VLDPE and 25% EVA. The optical properties of sample 2 are much better than samples 9 and 11. The reasons for this difference are not fully understood but may be related to the higher extrusion and biorientation temperatures required when higher melting VLDPE is blended in the outer layers with the lower melting EVA. This higher temperature more closely approaches the still higher melting point of the core layer and improve their compatibility. For this reason, either or both the fourth and fifth layers of the inventive film must have a melting point of at least about 105° C., so both layers cannot comprise 100% EVA.

The other difference between the samples 2, 9 and 11 films is that the sample 2 adhesive is a fractional melt index material (Plexar 3779) whereas the samples 9 and 11 adhesive material (Plexar 169) has a melt index of 2.5. As discussed hereinafter in more detail, for films of this invention with polyethylene-based modified anhydride adhesives the melt index of the adhesive should be below about 1.7. This provides the adhesive layer with enough strength to support the stretching forces during the orientation process.

Summarizing, samples 2, 3 and 6 are embodiments of the invention wherein the average melting points of the core (first) layer, the second and third intermediate adhesive layers and the fourth and fifth outer layers are progressively lower, i.e. for samples 2 and 3 they are 180° C., 116° and 115° C. and for sample 6 they are 171° C., 116° and 115° C. The second and third intermediate adhesive layers, and the fourth and fifth outer layers have fractional melt indexes. Film samples 7, 8 and 10 are optically unsatisfactory because nylon 6, 66 was not used in the core layer. Film samples 9 and 11 are optically unsatisfactory, in part because neither of their fourth and fifth outer layers have a melting point of at least about 105° C.

EXAMPLE 3

A series of tests were conducted with six different EVA (10% vinyl acetate) concentrations in the blend with VLDPE for the two outer layers. That is, each of the outer layers in a particular film had the same blend and they ranged from 25% EVA to 65% EVA. The VLDPE content was the difference between 100% and the sum of EVA content and 4.4% processing aid. Two types of VLDPE were used, the only difference of significance being their melt indexes, i.e. 0.5 for Attane type 61509.32 and 1.0 for Attane type 4001. The percentages of the total film thickness for the first to fifth layers of samples 12-17 were as follows: 3, 3, 3, 65 and 26%. The total thicknesses (in mils) for these samples were: 2.45 (sample 12), 2.49 (sample 13), 2.88 (sample 14), 2.49 (sample 15), 2.51 (sample 16) and 2.84 (sample 19). Accordingly, the core layer thicknesses were in the range of 0.07-0.09 mil. The core layer for all film samples was 80% EVOH H 103 and 20% nylon 1539, having an average melting point of 116° C. The second and third intermediate adhesive layers for all films were 52.5% Attane type 61509.32 VLDPE, 30% Plexar 3779 adhesive and 17.5% DQDA 6833 type EVA, their average melt index was 0.46 g/10 min. and their average melting point was 116° C. In addition to opticals, certain physical properties were measured. The data is summarized in Table H.

When measured under equivalent conditions, biaxially oriented EVA film provides higher shrink in each of the transverse and machine directions than biaxially oriented VLDPE film, although VLDPE has substantially higher heat shrink than linear low density polyethylene (LLDPE) with comonomers having the same carbon number. These relationships are for example described in the aforementioned Lustig et al U.S. Pat. No. 4,863,769, incorporated by reference to the extent pertinent. The EVA-VLDPE heat shrink relationship also exists in blends, i.e. a higher percentage of EVA provides higher biaxial heat shrink than lower EVA percentages in admixture with VLDPE. This relationship is illustrated by comparing samples 12-14 with each other or samples 15-17 with each other. It has been determined that to provide a biaxially oriented heat shrinkable film according to this invention, when the fourth and/or fifth outer layers contain EVA, it should not be present in quantity exceeding about 45 wt. % or the film's optical properties are unacceptable. This is probably because the relatively low melting point EVA lowers the average melting point of the outer layers to the level where incompatibilities develop during extrusion and/or biaxial orientation with the much higher melting temperature core layer.

Table H shows that the film optical properties (haze and gloss) become poorer with increasing EVA concentrations in the outer layer(s). This was also demonstrated in Table G by the previously discussed comparison between samples 2 (100% EVA) and sample 11 (75% LLDPE-25% EVA). That is, haze % tends to increase and gloss tends to decline. Moreover, dynamic puncture tends to decrease with increasing EVA concentration in the outer layer(s). Because of these conflicting trends, the preferred balance of properties with EVA-VLDPE blend fourth and fifth outer layers is between about 25% and about 40% EVA, and between about 60% and about 75% VLDPE. In a further preferred embodiment, the fourth and fifth outer layers each comprise a blend of between about 65 and about 72 wt. % VLDPE of about 0.912 density and about 0.19 melt index (DEFD type 1192), and between about 22 and about 28 wt. % EVA having about 10% vinyl acetate content.

Summarizing, samples 12-17 are invention embodiments wherein the average melting point of the core layer is higher than the other layers and the fourth and fifth outer layers have slightly lower melting points than the second and third intermediate adhesive layers. In each instance the core layer and adhesive layer melting points were 179° C. and 116° C. respectively. The outer layers of these samples have fractional melt indexes. The 45% EVA concentration limit in the outer layers is demonstrated by comparing the optical properties of samples 14 and 16.

TABLE H

| Sample No. | 12 | 13 | 14 | 15 | 16 | 17 |
|---|---|---|---|---|---|---|
| VLDPE in two outer layers | Attane 61509.32 | Attane 61509.32 | Attane 61509.32 | Attane 4001 | Attane 4001 | Attane 4001 |
| wt. % EVA (10% VA) | 25 | 35 | 45 | 45 | 55 | 65 |
| Outer layer Melt Index (g/10 min)/ Melting Point (°C.) | 0.42, (115) | 0.39, (112) | 0.38, (110) | 0.54, (110) | 0.47, (108) | 0.41, (106) |
| Film Thickness (mils) | 2.45 | 2.49 | 2.88 | 2.49 | 2.51 | 2.84 |
| Haze, % | 4.4 | 9.9 | 9.0 | 15.0 | 18.7 | 16.3 |
| Gloss H.U. | 78.7 | 59.5 | 62.8 | 47.9 | 43.9 | 48.1 |
| % Shrink MD/TD | | | | | | |
| at 90° C. | 17/37 | 18/36 | 31/42 | 22/40 | 22/35 | 27/36 |
| at 80° C. | 10/24 | 11/24 | 17/28 | 13/26 | 10/19 | 13/20 |
| Dynamic Puncture 2 (Kg · cm/mil) | 1.91 | 1.55 | 1.94 | 1.88 | 1.52 | 1.36 |
| $O_2$ Permeability (cc/m$^2$/24 hrs/atm) | 15.3 | 11.5 | 11.6 | 14.4 | 14.5 | 13.6 |

EXAMPLE 4

Another series of tests was conducted to demonstrate that various types of VLDPE materials can be used in the fourth and fifth outer layers of the five layer film of this invention. In these tests six different VLDPE materials were used in the fourth and fifth outer layers of samples 18-23 in blends with 25% EVA (10% vinyl acetate) and 4.4% processing aid. Since the adhesive and oxygen barrier core layers were substantially identical, the only significant variable was the type VLDPE. Certain physical properties of the films were measured, and the results are summarized in Table I.

Table I shows that four of the VLDPE's gave similar results in terms of physical properties, i.e. samples 19 and 21-23. Sample 20 was a blend of 50% Attane 61590.32 (comprising the only VLDPE in successful sample 19), and Attane 61512.21. Although the shrink was suitable, the other physical properties were somewhat lower than the single component VLDPE films. Moreover, sample 18 which had only Attane 61512.21 as its outer layer VLDPE, could not be manufactured because of low melt strength at the 400° F. die temperature. That is, a stable bubble could not be maintained. So this particular VLDPE material is unsuitable for use in the outer layers of the instant film with this particular formulation to form a heat shrinkable film by double bubble biaxial orientation. However, it is possible that such a film could be manufactured with different double bubble blowing equipment.

and Plexar 3741 (samples 22 and 23). The EVA was DQDA 6833 in all samples. The average melt indexes (in g/10 min) were as follows: 0.46 (samples 19-21), 0.62 (sample 22) and 0.89 (sample 23). The average melting point (in °C.) was 116° C. for each of samples 19-23.

For the fourth and fifth outer layers of the test series in this Example 4, the average melt indexes (in g/10 min) were as follows: 0.4 (sample 19), 0.55 (sample 20), 0.71 (sample 21), 0.21 (sample 22), and 0.71 (sample 23). The average melting point (in °C.) for each of samples 19-23 was 115° C.

It will be seen from the foregoing that invention embodiment samples 19-21 and 23 have second and third intermediate adhesive layers, and fourth and fifth outer layers with substantially the same average melting points which are below the (first) core layer melting point.

TABLE I

| | VLDPE Types In Outer Layers[1] | | | | | |
|---|---|---|---|---|---|---|
| VLDPE type<br>Sample No. | Attane<br>61512.21<br>18 | Attane<br>61509.32<br>19 | Attane 61509.32<br>(50%), Attane<br>61512.21 (50%)<br>20 | Attane 4001<br>21 | Union<br>Carbide 1192<br>22 | Attane<br>XU61520.01<br>23 |
| Film Thickness (mils) | Could not manufacture | 2.64 | 3.17 | 2.58 | 2.55 | 2.72 |
| Outer layer melt index (g/10 min)/ (melting point °C.) | due to low melt strength at 400° F. die temperature | 0.40/(115) | 0.55/(115) | 0.71/(115) | 0.21/(115) | 0.71/(115) |
| Tensile Strength (psi MD/TD) | | 10,200/<br>10,800 | 9,200/<br>9,800 | 10,500/<br>12,000 | 10,100/<br>8,000 | 9,400/<br>8,900 |
| % Elongation (MD/TD) | | 208/<br>143 | 180/<br>144 | 211/<br>104 | 235/<br>176 | 221/<br>198 |
| % Shrink MD/TD | | | | | | |
| at 90° C. | | 15/39 | 29/42 | 25/35 | 28/41 | 34/41 |
| at 80° C. | | 9/26 | 18/31 | 15/21 | 17/30 | 20/31 |
| $O_2$ permeability ($cc/m^2$ 24 hrs/atm) | | 13.0 | 13.9 | 11.9 | 13.2 | 9.1 |

[1]Blend formulation in two outer layers comprised 70.6% VLDPE 25% EVA (10% VA), and 4.4% processing aid.

For sample 18 the oxygen barrier core layer was 80% EVAL H101 type EVOH and 20% nylon 1539; the second and third adhesive layers were 52.5% Attane XU 61509.32 VLDPE, 30% Plexar 3779 adhesive and 17.59% DQDA 6833 type EVA.

Samples 19-23 are embodiments of the invention. The thicknesses in mils (and percentages of the total film thickness) for the first to fifth layers were as follows:

| Sample | |
|---|---|
| 19 | 0.079 (3), 0.079 (3), 0.079 (3), 1.719 (65.1), 0.676 (25.9) |
| 20 | 0.095 (3), 0.095 (3), 0.095 (3), 2.064 (65.1), 0.821 (25.9) |
| 21 | 0.078 (3), 0.078 (3), 0.078 (3), 1.680 (65.1), 0.668 (25.9) |
| 22 | 0.077 (3), 0.077 (3), 0.077 (3), 1.660 (65.1), 0.660 (25.9) |
| 23 | 0.082 (3), 0.082 (3), 0.082 (3), 1.77 (65.1), 0.704 (25.9) |

The oxygen barrier core layer comprised 20% nylon 1539 and 80% EVAL H101 type EVOH (samples 19-21), 80% H103 type EVOH (sample 22), and 80% Soarnol 3808 type EVOH (sample 23), and each had an average melting point of −179° C. (340° F.).

The second and third intermediate adhesive layers were 52.5% VLDPE, 30% adhesive and 17.5% EVA. The VLDPE was Attane XU 61509.32 (samples 19-21), DEFD 1192 (sample 22) and Attane XU 61520.01 (sample 23). The adhesive was Plexar 3779 (samples 19-21)

As previously explained, the second and third adhesive layers comprise a two or three component blend including between about 35% and about 80% VLDPE. These layers must have a fractional melt index to provide the adhesive layer with sufficient strength to withstand stretching the film during elevated temperature biaxial orientation. For the same reason, the second and third layers must have a fractional average melt index. Since VLDPE is typically the strongest constituent of the adhesive layers, at least about 35% VLDPE is needed for this component to perform its intended function. On the other hand, more than 80% VLDPE means the adhesive component is less than 20% of the total blend and this is insufficient to perform the adhesive function between the core layer and the outer layers. In a preferred embodiment reflecting these considerations, the VLDPE comprises between about 45% and about 60% of the second and third intermediate adhesive layers.

The second and third intermediate layers comprise blends with between about 20% and about 40% wt. adhesive component. Less than 20% does not provide the required adhesion between adjacent layers for the film. Greater than 40% adhesive increases the average melt index of these layers to a level where they do not have sufficient strength during the orientation process to support the film. In a preferred embodiment reflecting these considerations the adhesive component comprises between about 25% and 35% of the second and third intermediate adhesive layers.

The second and third intermediate layers contain 0 to about 40% EVA with vinyl acetate content of 7 to 15 wt. %. If present, this constituent increases the shrink properties of the film compared to a two component blend. On the other hand EVA has lower strength at the orientation temperature than VLDPE, and for this reason should not exceed about 40 wt. % of the layers. As a preferred balance, EVA is present in a concentration of between about 10 and about 20 wt. %.

EXAMPLE 5

A series of tests were conducted which demonstrate the importance of using a polyethylene-based modified anhydride adhesive with melt index below about 1.7 in the second and third intermediate adhesive layers of the instant film. The tests also demonstrate the nonsuitability of certain EVA-based adhesives. Nine films were prepared, each with five layers and substantially identical outer layers comprising 70.6% VLDPE, 25% EVA (10% vinyl acetate) and 4.4% processing aid with average melt index of 0.25 and average melting point of 115° C. The oxygen barrier core layers were identical and comprised 80% EVOH (EVAL H 103) and 20% nylon 6,66 (Allied type 1539). The only difference of substance between samples 24–32 was the adhesive layer. With the exception of sample 24 all samples included 30 wt. % adhesive component in the second and third layers. Optical properties were observed visually and the shrink was measured. The results of these tests are summarized in Table J which is best understood by reference to Table E identifying each of the adhesives used in samples 24–32. As previously explained, the inventive film is suitable for packaging fresh red meat, so must have good optical properties, i.e. few visual stress lines, low haze and high gloss.

It has been discovered that with these five layer films, optically unacceptable stress lines can occur. Their presence (or absence) is directly related to the type of adhesive used in these layers. Sample 28 was marginally acceptable with few stress lines, and the adhesive layers included 30% Plexar 3779 which is an LLDPE-based maleic anhydride modified copolymer (melt index 0.81). Sample 29 was very similar to sample 28, the only difference being the use of Dow type 61509.32 VLDPE in the adhesive and outer layers instead of Union Carbide's type 1192 VLDPE. There were no visual stress lines in sample 29, so its optical properties were superior to sample 28. With one exception (sample 32), sample 31 was the only other film which was without stress lines and its adhesive component was Plexar 3741, a low density polyethylene-based maleic anhydride modified copolymer. The adhesive layers of samples 28, 29 and 31 comprised 49% VLDPE/17% EVA/30% adhesive and 4% processing aid, and as will be apparent from the ensuing discussion, they are the only invention embodiments in Table J. Accordingly in a preferred embodiment the second and third adhesive layers comprise a blend of between about 48 and about 55 wt. % very low density polyethylene of fractional melt index, between about 15 and about 22 wt. % ethylene vinyl acetate of about 0.25 melt index and 10% vinyl acetate content, and between about 25 and about 35 wt. % low density polyethylene based maleic anhydride modified adhesive. The thickness in mils (and percentages of the total film thickness) for the first to fifth layers of samples 28, 29 and 31 were as follows:

Samples
28—0.085 (3.0), 0.085 (3.0), 0.085 (3.0), 1.933 (65.1), 0.730 (25.9) 29—0.077 (3.0), 0.077 (3.0), 0.077 (3.0), 1.673 (65.1), 0.665 (25.9)
31—0.089 (3.0), 0.089 (3.0), 0.089 (3.0), 1.933 (65.1), 0.769 (25.9)

The oxygen barrier core layer for samples 24–32 was 80% EVAL type H101 EVOH and 20% nylon 1539 with an average melting point of 179° C.

Sample 24 included Admer 500 as the adhesive; Table E identifies this material as an LLDPE-based maleic anhydride modified copolymer with a relatively high melt index of 2.0. Because of this high value, the film had a substantial number of stress lines and would be optically unsuitable for the intended use of the inventive film. In contrast, otherwise similar film with Plexar 3741 polyethylene-based modified anhydride adhesive (melt index 1.5) such as sample 31 has good optical properties. Accordingly, to be useful in this invention such polyethylene based adhesives should have a melt index below about 1.7 g/10 min. This insures that the adhesive layer has sufficient strength during the orientation process to support the film. Higher melt indexes cannot withstand the stress under these conditions. For the same reason, the adhesive layer blend of the invention film must have an average melt index which is fractional.

Sample 25 included a 70% Surlyn 1650-30% Plexar 106 adhesive layer; the latter is an EVA-based maleic anhydride copolymer with 1.2 MI. The film had a substantial number of stress lines, probably due to the relatively high melt indexes of the EVA-based adhesive and the adhesive layer, so would be optically unsuitable for packaging fresh red meat. Sample 26 also contained 30% Plexar 106 as the adhesive component and had a relatively high melt index EVA base (1.2). This sample exhibited an objectionable number of stress lines.

Sample 27 contained 30% Bynel CXA 3048 as the adhesive, and is identified as an EVA-based terpolymer with 0.9 melt index (Table E). Despite this low MI and a fractional melt index adhesive layer, the film had a substantial number of stress lines in the machine direction.

Sample 30 contained 30% Plexar 169 as the adhesive; this copolymer is a low density polyethylene based maleic anhydride modified material with 2.5 melt index (ref. Table E). The sample displayed a substantial number of stress lines in the machine direction, so is unsuitable for the purposes of the present invention. This was due to the relatively high melt index of the adhesive, such that the core layer was not uniformly stretched during orientation.

Sample 32 contained 30% Orevac 18302 as the adhesive; this is an EVA-based terpolymer with 0.8 melt index (ref.: Table E). Despite this relatively low melt index resulting in a fractional average melt index for the second and third adhesive layers and good optical properties, the film was unsatisfactory because of poor interlayer adhesion. As hereinafter demonstrated in Example 38, to overcome this problem, the melt index of EVA-based adhesives useful in this invention must be extremely low, i.e. below about 0.5 g/10 min.

In invention embodiment sample 31, the average melting points progressively decline from the core layer to the second-third intermediate adhesive layers to the fourth-fifth outer layers. Each of these samples have fractional melt index adhesive layers and each has at least 30% free shrink at 90° C. in the transverse direction.

outer layers comprised a three component blend of VLDPE, EVA and an ethylene alpha olefin plastomer-type copolymer which was Mitsui's Tafmer 1085 (melt-

TABLE J

| | Adhesive Layer Blends | | | |
|---|---|---|---|---|
| Sample No. | 24 | 25 | 26 | 27 |
| VLDPE Type in Two Outer Layers | UCC (1192) | UCC (1192) | UCC (1192) | UCC (1192) |
| Adhesive Layers: Composition | 60% Admer 500/ 40% EVA (10% VA) | 70% Surlyn 1650(3)/30% Plexar 106(8) | 70% Blend(1)/ 30% Plexar 106(8) | 70% Blend(1)/ 30% CXA 3048(6) |
| Average MI (g/10 min) | 1.0 | 1.5 | 0.35 | 0.32 |
| Weighted Average MP (°C.) | 112 | 95 | 110 | 110 |
| Film Thickness (mils) | 2.83 | 2.67 | 2.75 | 2.84 |
| % Shrink at 90° C. MD/TD | 14/38 | 20/40 | 21/39 | 20/38 |
| Optical Properties (visual) | Lines(2) | Lines(2) | Lines(2) | Lines(2) |

| Sample No. | 28(9) | 29(9) | 30 | 31(9) | 32 |
|---|---|---|---|---|---|
| VLDPE Type in Two/Outer Layers | UCC (1192) | Dow (61509.32) | UCC (1192) | UCC (1192) | UCC (1192) |
| Adhesive Layers: Composition | 70% Blend(1)/ 30% Plexar 3779 | 70% Blend(1) 30% Plexar 3779 | 70% EVA (10% VA)/ 30% Plexar 169 | 70% Blend(1)/ 30% Plexar 3741 | 70% Blend(1)/ 30% Orevac 18302(7) |
| Average MI (g/10 min) | 0.31 | 0.52 | 0.51 | 0.38 | 0.31 |
| Average MP (°C.) | 117 | 117 | 105 | 120 | — |
| Film Thickness | 2.82 | 2.53 2.61 | 1.98 | 2.97 | 3.48 |
| % Shrink at 90° C. MD/TD | 21/39 | 20/34 22/38 | 28/36 | 18/35 | 30/40 |
| Optical Property (visual and measured) | few lines(2) | good appearance; no lines | line(2) | no lines; haze 8.5% gloss 65 HU | no lines; haze 7.2% gloss 70 Hu |

(1)For sample 26, 27, 28, 29, 31 and 32 the adhesive layer comprises 49% VLDPE, 17% EVA, 30% adhesive and 4% processing aid.
(2)Stress lines in machine direction.
(3)Surlyn 1650 is a zinc ionomer with 1.6 melt index and 94° C. melting point, sold by DuPont Chemical Company.
(5)Interlayer adhesion in this film was poor relative to other films in this Table so it was unacceptable.
(6)CXA 3048 is EVA based adhesive per Table E
(7)Orevac 18302 is EVA based adhesive with 0.8 MI per Table E
(8)Plexar 106 is EVA based adhesive with 1.2 MI per Table E
(9)Invention embodiment

EXAMPLE 6

In the previously described invention embodiments, the shrink levels were typically about 31% in the machine direction and about 39% in the transverse direction, both measured at 90° C. This is satisfactory for most fresh red meat packaging applications, but it would be desirable to provide even higher shrink levels for certain end uses of the instant five layer film.

This may be accomplished by employing different thermoplastic polymers in either or both the outer layers, and was demonstrated by two higher shrink embodiments of the inventive film. In these tests summarized in Table K, four films were used. Samples 33-35 are invention embodiments with identical oxygen barrier core layers: 80% EVAL H 103 type EVOH and 20% nylon type 1539. The core layer's polymer blend average melting point was 164° C. The intermediate second and third adhesive layers of samples 33 and 34 are identical, and sample 35 is very similar. Their average melt index was 0.61 g/10 min and their average melting point was 116° C.

The outer layers of sample 33 were the aforedescribed VLDPE-EVA blend with an average melting point of 115° C., and this film provides average shrink properties for fresh red meat packaging. The sample 34 ing point 71° C.). Table K shows this film to have substantially higher shrink properties than average shrink sample 33. Moreover its other physical properties and optical properties were superior to sample 33. The melt index of the outer layers was 0.25, below the corresponding value of 0.61 for the adjacent intermediate layers. The 100° C. average melting point of the outer layers was below the corresponding value of 116° C. for the adjacent intermediate layers. The thicknesses in mils (and percentages of the total film thicknesses) for the first to fifth layers were as follows: 0.08 (3)/0.08 (3)/0.08 (3)/1.64 (63)/0.73 (28). Accordingly, in a preferred high shrink embodiment, at least one of the fourth and fifth outer layer comprises a blend of between about 40 and about 60% VLDPE, between about 5 and about 20 wt. % plastomeric ethylene alpha olefin copolymer, and between about 20 and about 40 wt. % ethylene vinyl acetate having between about 7 and about 15 wt. % vinyl acetate content.

For sample 35, the fourth outer layer (which would be the inner layer of a bag converted from the film) comprised 100% Surlyn 1706 ionomer, manufactured by DuPont Company and the fifth outer layer (which would be the outer layer of a bag) was identical to the outer layers of regular shrink film (110° C. average melting point). Table K shows this film to also have substantially higher shrink properties than regular shrink sample 33. Its optical properties were even superior to sample 34 but the dynamic puncture strength was lower. Since the average melting point of the fourth outer layer was 81° C., it was below the corresponding value of 103° C., for the second intermediate layer. The film thicknesses in mils (and percentages of the total film thicknesses) for the first to fifth layers olefin plastomer having density of about 0.88, melt index of about 1.4 gms/10 min, and about 71° C. melting point.

Another preferred high shrink embodiment of the invention has an ionomer as at least one constituent of the fourth outer layer. The latter may for example comprise a blend of EVA and ionomer, or as in sample 36 the fourth outer layer may comprise 100% ionomer.

TABLE K

| | High Shrink Film Formulation | | | |
|---|---|---|---|---|
| Film Type Sample No. | Regular Shrink Invention Film[1] 33 | Plastomer Type High Shrink Invention Film[1] 34 | Ionomer Type High Shrink Invention Film[1] 35 | W.R. Grace Type BB4-E Film 36 |
| Composition | Outer layers: 70.6% VLDPE (UCC 1192), 25.0% EVA (UCC 6833), 4.4% processing aid | Outer layers: 44.3% VLDPE (Dow XU61520.01), 36.3% EVA (UCC 6833), 15.0% Tafmer 1085[3], 4.4% processing aid | Fifth outer layer identical to Sample 33. Fourth outer layer 100% Surlyn 1706 ionomer[2] | EVA/Adh/EVOH/Adh/EVA/PE |
| Film Thickness (mils) | 2.6 | 2.6 | 2.9 | 2.6 |
| Tensile Strength, psi, MD/TD | 8500/7500 | 10000/9700 | 10000/9500 | 5100/4700 |
| % Shrinkage | | | | |
| at 90° C. | 31/39 | 41/47 | 44/57 | 36/46 |
| at 80° C. MD/TD) | 18/27 | 23/33 | 33/43 | 19/35 |
| Impulse Sealing Range, volts | 36–50 | 32–42 | 36–50 | 35–50 |
| Haze, % | 7.0 | 5.4 | 2.8 | — |
| Gloss, Hu units | 73 | 80 | 86 | — |
| Dynamic Puncture (Kg-cm) | 3.5 | 6.2 | 2.0 | 1.8 |
| O₂ Permeability cc/m²/24 hrs/atm | 21.7 | 20.1 | 17.0 | 17.0 |

[1]The core layers for all three inventive films were the same (80% H103 type EVOH, 20% nylon type 1539), and as set forth in sample 3, Table F. The second and third intermediate adhesive layers for samples 33 and 34 were 52.5% type 61509.32 VLDPE, 17.5% type 6833 EVA and 30% Plexar type 3741 adhesive - very similar to sample 31 (Table J). The sample 35 adhesive layers were 52.5% type 1192 VLDPE, 17.5% type 6833 EVA and 30% Plexar type 3779 adhesive - very similar to sample 29 (Table J).
[2]Surlyn 1706 is a zinc ionomer with 0.7 melt index and 81° C. melting point, manufactured by DuPont Company
[3]Tafmer 1085 is a plastomer-type ethylene alpha olefin with 0.88 density, 1.4 melt index (g/10 min) and 71° C. melting point manufactured by Mitsui Petrochemicals Ltd.

were as follows: 0.09 (3)/0.09 (3)/0.09 (3)/1.83 (63)/0.81 (28). The total thickness of the film was 2.9 mils.

For purposes of comparison, sample 36 was a competitive six layer heat shrinkable film with an EVOH core layer. The film was W. R. Grace's type BB4-E which has been proposed for packaging fresh red meat. Table K shows that the heat shrink of inventive embodiment samples 34 and 35 are at least equivalent or even superior to this competitive film, as are the dynamic puncture strength values.

One preferred high shrink embodiment of the invention has fourth and fifth outer layers each comprising a blend of between about 42 and about 46 wt. % very low density polyethylene of about 0.912 density, between about 34 and about 38 wt. % ethylene vinyl acetate having about 10 wt. % vinyl acetate content, and between about 13 and about 17 wt. % ethylene alpha

EXAMPLE 7

In this example the physical properties of two embodiments of this invention (regular shrink and high shrink) are compared with two commercially used vinylidene chloride-methyl acrylate barrier type three layer films (high strength MA saran and high shrink MA saran). Also, these invention embodiments are compared with two commercially used EVOH barrier type films. The comparisons are summarized in Table L.

Table L shows that on the basis of shrink, dynamic puncture and oxygen permeability comparisons, the inventive five layer films are at least comparable to the vinylidene chloride copolymer-type three layer biaxially oriented heat shrinkable films presently used for packaging fresh red meat. Likewise they are at least comparable to prior art commercially available multilayer EVOH type films.

TABLE L

| | Film Physical Properties | | | | | |
|---|---|---|---|---|---|---|
| Sample Designation | High Strength MA Saran | High Shrink Ma Saran | Regular Shrink Invention Embodiment | High Shrink Invention Embodiment | Competitive EVOH No. 1 | Competitive EVOH No. 2 |
| Composition | VLDPE-EVA/MA-VDC/VLDPE-EVA | EVA/MAS/EVA | See[1] | See[2] | W.R. Grace Type BB4-E (Crosslinked EVA/Adh/EVOH Adh/EVA/PE | Mitsubishi Diamerion S-EL (EVA/nylon-EVOH/EVA |

TABLE L-continued

| | Film Physical Properties | | | | | |
|---|---|---|---|---|---|---|
| Sample Designation | High Strength MA Saran | High Shrink Ma Saran | Regular Shrink Invention Embodiment | High Shrink Invention Embodiment | Competitive EVOH No. 1 | Competitive EVOH No. 2 |
| Film Thickness (mils) | 2.1 | 2.3 | 2.6 | 2.6 | 2.6 | 2.3 |
| % Shrink MD/TD | | | | | | |
| at 90° C. | 25/34 | 38/48 | 31/39 | 41/47 | 36/46 | 38/38 |
| at 80° C. | — | 19/30 | 18/27 | 23/33 | 19/35 | 30/33 |
| Dynamic Puncture (Kg/cm) | 5.1 | 4.5 | 3.5 | 6.2 | 1.8 | 2.8 |
| $O_2$ Permability (cc/m²/ 24 hrs/atm) | 18.6 | 18.6 | 21.7 | 20.1 | 17.0 | 12.4 |

(1)Composition on weight basis: 70.6% VLDPE-25.0% EVA-4.4% processing aid in the outer layers with one of these having 1.64 mil thickness and the other having 0.72 mil thickness, an oxygen barrier core layer comprising 80% EVOH (38% ethylene, 8.4 MFI)-20% nylon 6,66 of 0.08 mil thickness, and two intermediate layers each 0.08 mil thick and comprising 52.5% VLDPE, 17.3% EVA and 30.0% LLDPE (hexene) based maleic anhydride modified adhesive, 0.8 MI.
(2)See sample 34, Table J for composition.

EXAMPLE 8

In this example, five layer films were prepared using a 10 wt. % vinyl acetate-type ethylene vinyl acetate (EVA)-based modified anhydride adhesive having melt index of about 0.25 g/10 min (Quantum's PPX 5075) in second and third adhesive layer blends with only VLDPE as the other blend component (sample 39), or in a three component blend with EVA (as a separate constituent) and VLDPE (sample 38). The optical and physical properties of these films were determined and compared with a five layer film differing only in the use of an LLDPE-based modified anhydride adhesive (sample 37). All of these films had fractional average melt index adhesive layers.

More specifically, samples 37, 38 and 39 were each about 2.6 mils thick and each included an oxygen barrier core layer comprising 80% EVAL H103 type EVOH and 20% nylon 1539 type 6, 66. The fourth outer layer of these samples comprised 75% DEFD 1192 type VLDPE and 25% DQDA 6833 type EVA. The fifth outer layer of these samples comprised 70.6% DEFD 1192 type VLDPE, 25% DQDA 6833 type EVA and 4.4% processing aid. The adhesive layers of samples 37 and 38 included 52.5% type 61509.32 VLDPE, 30% adhesive component and 17.5% DQDA 6833 type EVA. The sample 37 adhesive was the aforedescribed Plexar 3779 with 0.8 MI (see Table E). The sample 38 adhesive was Quantum's EVA-based Plexar type PPX 5075 (0.25 MI). The sample 39 adhesive layers comprised a two component blend of 75% type 61509.32 VLDPE and 25% of the aforedescribed Quantum type PPX 5075 adhesive. The core layer of these samples comprised about 3% of the film thickness, and the second and third adhesive layers each also comprised about 3% of the film thickness. The fourth (inner) layer comprised about 63% and the fifth (outer) layer comprised 28% about of the film thickness.

The physical characteristics of these films are summarized in Table M and their physical properties are summarized in Table N.

TABLE M

| | EVA-Based Adhesive Film Characteristics | | | | |
|---|---|---|---|---|---|
| Sample No. | Type Adhesive (melt index-g/ 10 min) | Oxygen Barrier Layer Thickness (mil) | Layers Wgt. Ave Melting Point (°C.) 1/2/3/4/5 | Layers Ave. Melt Indices 1/2/ 3/4/5 | Adhesive Layer Comp. |
| 37 | LLDPE (0.8) | 0.8 | 179 | NA | 52.5% |
| | | | 116 | 0.50 | VLDPE |
| | | | 116 | 0.50 | 30% |
| | | | 115 | 0.20 | Adhesive |
| | | | 115 | 0.20 | 17.5% EVA |
| 38 | EVA (0.25) | 0.8 | 179 | NA | 52.5% |
| | | | 109 | 0.36 | VLDPE |
| | | | 109 | 0.36 | 30% |
| | | | 115 | 0.20 | Adhesive |
| | | | 115 | 0.20 | 17.5% EVA |
| 39 | EVA (0.25) | 0.8 | 179 | NA | 75% |
| | | | 115 | 0.42 | VLDPE |
| | | | 115 | 0.42 | 25% |
| | | | 115 | 0.20 | Adhesive |
| | | | 115 | 0.20 | |

TABLE N

| | EVA-Based Adhesive Film Properties | | |
|---|---|---|---|
| Film Type | LLDPE- Based Adhesive | EVA- Based Adhesive(1) | EVA-Based Adhesive(2) |
| Sample No. | 37 | 38 | 39 |
| Film Thickness (mils) | 2.97 | 2.47 | 2.72 |
| Tensile Strength psi MD/TD | 8600/7900 | 8700/8200 | 8500/8300 |
| Elongation at break (RM) MD/TD | 287/161 | 221/151 | 219/165 |
| % Shrinkage | | | |
| at 90° C. | 18/35 | 32/38 | 33/44 |
| at 80° C. MD/TD | — | 18/32 | 20/32 |
| Dynamic Puncture Cmkg/mil | 1.7 | 1.6 | 1.7 |
| Haze, % | 8.5 | 5.3 | 5.4 |
| Gloss Hu units | 65.4 | 77.9 | 78.8 |
| $O_2$ permeability cc/m(2)/24 hr./atm | 9.8 | 12.2 | 10.8 |

(1)Adhesive layer also included, VLDPE
(2)Adhesive layer also includes VLDPE and EVA Sample 38 demonstrates that five layer films of this invention include adhesive layers wherein the adhesive is an EVA-based modified anhydride type with very low melt index, i.e. below about 0.5 g/10 min. Moreover, samples 38 and 39 third adhesive layers may comprise either a two component blend of VLDPE and adhesive or a three component blend of VLDPE, EVA and adhesive with the EVA comprising up to about 25% of the total adhesive layer weight and having a fractional melt index. The EVA content of the three component blend should not exceed about 40% because as previously explained, higher EVA contents do not provide the adhesive layers with sufficient strength to support the film at the orientation conditions.

Tables M and N indicate that the EVA-based adhesive samples 38 and 39 were equivalent to LLDPE-based adhesive sample 37 in terms of physical strength, shrinkage and oxygen permeability, and their optical properties were considered good. The optical performance of these 0.25 melt index based adhesive samples are substantially superior to that of substantially higher melt index type EVA-based adhesive films such as samples 25 and 26 (EVA adhesive with MI of 1.2) and sample 27 (EVA terpolymer based adhesive with MI of 0.9). Each of these films had lines. A possible explanation is that EVA as an adhesive base is weaker than the polyethylene and has a lower melting point, so a lower melt index EVA-based adhesive (less than about 0.5) is required to provide the same strength as a support for the stretching forces in the film than with a polyethylene-based adhesive (melt index less than about 1.).

Accordingly, a preferred EVA-based adhesive has a melt index of about 0.25 g/10 min and a vinyl acetate content of about 10 wt. %.

Further modifications of the invention will be apparent to those skilled in the art and all such modifications are deemed to be within the scope of the invention as outlined in the following claims.

What is claimed is:

1. A biaxially stretched oriented heat shrinkable multilayer film prepared by the double bubble process having at least five layers comprising:
    a) an oxygen barrier core layer comprising a polymer blend of between about 70 and about 85 wt. % ethylene vinyl alcohol (EVOH) and between about 15 and about 30 wt. % nylon 6,66 copolymer, said EVOH having a melting point of between about 162° C. and about 178° C. and comprising between about 36 and about 44 wt. % ethylene, and said polymer blend having a relatively high average melting point, said core layer having a thickness of between about 0.05 and about 0.1 mil and providing an oxygen barrier such that the oxygen permeability through the film is below about 35 cc./m²/24 hours;
    b) second and third intermediate adhesive layers directly adhered to opposite sides of said core layer and each comprising a blend of between about 35 and about 80 wt. % very low density polyethylene and between about 20 and about 40 wt. % of either polyethylene-based modified anhydride adhesive having melt index below about 1.7 g/10 min or ethylene vinyl acetate-based modified anhydride adhesive having melt index below about 0.5 g/10 min, and between 0 and about 40 wt. % ethylene vinyl acetate having fractional melt index and between about 7 and about 15 wt. % vinyl acetate content, said blend having a fractional average melt index and also having a relatively low average melting point below said melting point of said polymer blend of said core layer, said second and third intermediate adhesive layers each comprising between about 2.5 and about 5% of the film thickness;
    c) a self heat sealable fourth outer layer directly adhered to one side of said second intermediate adhesive layer and comprising thermoplastic polymer with ethylene vinyl acetate content between 0 and about 45 wt. %, having a fractional melt index and also a relatively low melting point below said melting point of said polymer blend of said core layer, said fourth outer layer comprising between about 40% and about 70% of the film thickness; and
    d) an abuse-resistant fifth outer layer directly adhered to one side of said third intermediate adhesive layer and comprising thermoplastic polymer with ethylene vinyl acetate content between 0 and about 45 wt. %, having a fractional melt index and also a relatively low melting point below said melting point of said polymer blend of said core layer, said fifth outer layer comprising between about 20% and about 35% of the film thickness;
    e) at least one of said fourth and fifth outer layers having a melting point of at least about 105° C.; and
    f) said film having at least 30% free shrink at 90° C. in the transverse direction and a total thickness of between about 1.5 and about 3.5 mils.

2. A film according to claim 1 wherein said fifth outer layer is identical to said fourth outer layer.

3. A film according to claim 1 wherein said fourth and fifth outer layers each comprise a polymer blend of between about 60 and about 75 wt. % very low density polyethylene, and between about 25 and about 40 wt. % ethylene vinyl acetate.

4. A film according to claim 1 wherein at least one of said fourth and fifth outer layers comprises a blend of between about 40 and about 60 wt. % very low density polyethylene, between about 5 and about 20 wt. % plastomeric ethylene alpha olefin copolymer, and between about 20 and about 40 wt. % ethylene vinyl acetate having between about 7 and about 15 wt. % vinyl acetate content.

5. A film according to claim 1 wherein said EVOH has about 38 wt. % ethylene and melt index of about 8 gm/10 min.

6. A film according to claim 1 wherein said adhesive is a linear low density polyethylene based, maleic anhydride modified material.

7. A film according to claim 1 wherein very low density polyethylene comprises between about 45% and about 60 wt. % of the second and third intermediate adhesive layers.

8. A film according to claim 1 wherein said modified anhydride adhesive comprises between about 25% and about 35 wt. % of the second and third intermediate adhesive layers.

9. A film according to claim 1 wherein ethylene vinyl acetate comprises between about 10% and about 20 wt. % of the second and third intermediate adhesive layers.

10. A film according to claim 1 wherein said second and third adhesive layers comprise a blend of between about 48 and about 55 wt. % very low density polyethylene having a fractional melt index, between about 15 and about 22 wt. % ethylene vinyl acetate of about 0.25 g/10 min melt index and 10% vinyl acetate content, and between about 25 and about 35 wt. % low density polyethylene based maleic anhydride modified adhesive.

11. A film according to claim 1 wherein the modified anhydride adhesive of the second and third intermediate adhesive layers is ethylene vinyl acetate based having melt index of about 0.25 g/10 min and the vinyl acetate content of said ethylene vinyl acetate is about 10 wt. %.

12. A film according to claim 5 wherein said adhesive has a fractional melt index.

13. A film according to claim 1 wherein said film is irradiated at dosage of 1–10 MR.

14. A film according to claim 1 wherein said core layer comprises a blend of between about 78 and 82 wt. % EVOH and between about 12 and 18 wt. % nylon 6,66.

15. A film according to claim 1 wherein said fourth outer layer and said fifth outer layer each comprise a blend of between about 65 and about 72 wt. % very low density polyethylene of about 0.912 density and about 0.19 g/10 min melt index, and between about 22 and about 28 wt. % ethylene vinyl acetate having about 10% vinyl acetate content.

16. A film according to claim 1 wherein said fourth outer layer and said fifth outer layer each comprise a blend of between about 42 and about 46 wt. % very low density polyethylene of about 0.912 density, between about 34 and about 38 wt. % ethylene vinyl acetate having about 10 wt. % vinyl acetate content, and between about 13 and about 17 wt. % ethylene alpha olefin plastomer of about 0.80 density about 1.4 gms/10 min melt index, and about 71° C. melting point.

17. A film according to claim 1 wherein said fourth outer layer includes an ionomer.

18. A film according to claim 1 having at least 20% free shrink at 90° C. in the machine direction.

19. A film according to claim 1 having at least 35% free shrink in both the machine and transverse directions.

20. A biaxially stretched oriented heat shrinkable multilayer film prepared by the double bubble process having at least five layers comprising:

a) an oxygen barrier core layer comprising a polymer blend of between about 70 and about 85 wt. % ethylene vinyl alcohol (EVOH) and between about 15 and about 30 wt. % nylon 6,66 copolymer, said EVOH having a melting point of between about 162° C. and about 178° C. and comprising between about 36 and about 44 wt. % ethylene, and said polymer blend having a relatively high average melting point, said core layer having a thickness of between about 0.05 and about 0.1 mil and providing an oxygen barrier such that the oxygen permeability through the film is below about 35 cc./m$^2$/24 hours;

b) second and third intermediate adhesive layers directly adhered to opposite sides of said core layer and each comprising a blend of between about 35 and about 80 wt. % very low density polyethylene and between about 20 and about 40 wt. % of either polyethylene-based modified anhydride adhesive having melt index below about 1.7 g/10 min or ethylene vinyl acetate-based modified anhydride adhesive having melt index below about 0.5 g/10 min, and between 0 and about 40 wt. % ethylene vinyl acetate having fractional melt index and between about 7 and about 15 wt. % vinyl acetate content, said blend having a fractional average melt index and also having a relatively low average melting point below said melting point of said polymer blend of said core layer, said second and third intermediate adhesive layers each comprising between about 2.5 and about 5% of the film thickness;

c) a self heat sealable fourth outer layer directly adhered to one side of said second intermediate adhesive layer comprising about 40% and about 70% of the film thickness and an abuse-resistant fifth outer layer directly adhered to one side of said third intermediate adhesive layer comprising between about 20% and about 35% of the film thickness, each of said fourth and fifth outer layers having a melting point of at least about 105° C. and a fractional melt index, and also a relatively low melting point below said melting point of said polymer blend of said core layer;

d) each of said fourth and fifth outer layers comprising a blend of between about 60 and about 75 wt. % very low density polyethylene, between about 25 and about 40 wt. % ethylene vinyl acetate and, as an optional component, between about 5 and about 20 wt. % of a plastomeric ethylene alpha olefin copolymer, and if said plastomeric ethylene alpha olefin copolymer is present, the amount of very low density polyethylene being between about 40 and 60 wt. % and the amount of ethylene vinyl acetate being between about 20 and about 40 wt. %; and e) said film having at least 30% free shrink at 90° C. in the transverse direction and a total thickness of between about 1.5 and about 3.5 mils.

* * * * *

UNITED STATES PATENT AND TRADEMARK OFFICE
CERTIFICATE OF CORRECTION

PATENT NO. : 5,382,470
DATED : January 17, 1995
INVENTOR(S) : Stephen J. Vicik

It is certified that error appears in the above-identified patent and that said Letters Patent is hereby corrected as shown below:

Column 31, claim 1,
Line 44, amend "wt." to -- mol --.

Column 32, claim 5,
Line 41, amend "wt." to -- mol --.

Column 33, claim 20,
Line 44, amend "wt." to -- mol --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*